United States Patent
Takao et al.

[11] Patent Number: 6,139,927
[45] Date of Patent: Oct. 31, 2000

[54] LIQUID CRYSTAL DEVICE

[75] Inventors: Hideaki Takao, Machida; Masahiro Terada, Hadano; Yasushi Shimizu, Atsugi; Katsumi Arai, Minanomachi; Shosei Mori, Hiratsuka; Yasufumi Asao; Takashi Moriyama, both of Atsugi; Takeshi Togano, Chigasaki, all of Japan

[73] Assignee: Canon Kabushiki Kaisha, Tokyo, Japan

[21] Appl. No.: 09/154,735

[22] Filed: Sep. 17, 1998

[30] Foreign Application Priority Data

Sep. 18, 1997 [JP] Japan ................... 9-253437

[51] Int. Cl.⁷ .................. C09K 19/52; C09K 19/56; G02F 1/1337
[52] U.S. Cl. .................. 428/1.26; 252/299.01; 252/299.4; 428/1.25; 349/123; 349/126; 349/128; 349/133; 349/137
[58] Field of Search .............. 252/299.01, 299.4; 428/1.25, 1.26; 349/123, 126, 128, 133, 137

[56] References Cited

U.S. PATENT DOCUMENTS 4,876,330 10/1989 Higashi et al. .................. 528/353
4,879,059 11/1989 Hanyu et al. .................. 252/299.4
5,064,697 11/1991 Takiguchi et al. .................. 428/1.26

(List continued on next page.)

FOREIGN PATENT DOCUMENTS 56-107216 8/1981 Japan .
WO 93/22396 11/1993 WIPO .

OTHER PUBLICATIONS

Marc D. Radcliffe et al., "Smectic A and Smectic C Materials with Large Negative Thermal Expansion Coefficients, p. 46", pp. 169–170, 1993.

Atsuo Fukuda et al., "Structure and Properties of Ferroelectric Crystals, 1990", pp. 344–356, 1990.

A.D.L. Chandani et al., "Tristable Switching in Surface Stabilized Ferroelectric Liquid Crystals with a Large Spontaneous Polarization", Japanese Journal of Applied Physics, vol. 27, No. 5, May, 1988, pp. L729–L732.

Akihiro Mochizuki et al., "Future Liquid Crystal Display and its Materials", pp. 37–72, 1992.

N.A. Clark et al., "Structures and Applications of SSFLC Devices", Proceedings of the 6$^{th}$ International Display Research Conference, 1986, pp. 456–458.

M. Schadt et al., Voltage–Dependent Optical Activity of a Twisted Nematic Liquid Crystal, Applied Physics Letters, vol. 18, No. 4, Feb., 1971, pp. 127–128.

Yukio Ouchi et al., "Smectic C" Chevron Layer Structure Studied by X–Ray Diffraction, Japanese Journal of Applied Physics, vol. 27, No. 5, May, 1988. pp. L725–L728.

*Primary Examiner*—Shean C. Wu
*Attorney, Agent, or Firm*—Fitzpatrick, Cella, Harper & Scinto

[57] ABSTRACT

A liquid crystal device is constituted by a pair of substrates each provided with an electrode, and a chiral smectic liquid crystal composition disposed between the substrates. At least one of the substrates is provided with an alignment control film of a polyimide represented by the following formula (I):

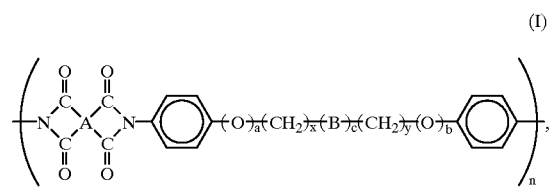

in which A denotes a planar tetravalent organic residue group; B denotes a divalent group represented by $-CR_1(R_2)-$ where $R_1$ and $R_2$ independently denote H or alkyl group; a, b and c are independently 0 or 1; x and y are independently an integer of at least 0 and $x+y=$ at least 1; and n is an integer of at least 2.

16 Claims, 8 Drawing Sheets

U.S. PATENT DOCUMENTS

| | | | |
|---|---|---|---|
| 5,320,883 | 6/1994 | Asaoka et al. | 428/1 |
| 5,326,600 | 7/1994 | Asaska et al. | 428/1.26 |
| 5,330,803 | 7/1994 | Takao et al. | 428/1 |
| 5,381,256 | 1/1995 | Hanyu et al. | 359/75 |
| 5,400,159 | 3/1995 | Takao et al. | 359/76 |
| 5,419,931 | 5/1995 | Asaoka et al. | 428/1 |
| 5,419,932 | 5/1995 | Togano et al. | 428/1 |
| 5,464,668 | 11/1995 | Asaoka et al. | 428/1 |
| 5,510,159 | 4/1996 | Asaoka et al. | 428/1.26 |
| 5,518,782 | 5/1996 | Takao et al. | 428/1 |
| 5,552,193 | 9/1996 | Asaoka et al. | 428/1 |
| 5,576,864 | 11/1996 | Takao et al. | 359/76 |
| 5,587,211 | 12/1996 | Togano et al. | 428/1 |
| 5,626,925 | 5/1997 | Asaoka et al. | 428/1 |
| 5,633,740 | 5/1997 | Asaoka et al. | 349/129 |
| 5,657,141 | 8/1997 | Terada et al. | 349/184 |
| 5,686,019 | 11/1997 | Nakamura | 252/299.01 |
| 5,714,209 | 2/1998 | Asaoka et al. | 428/1 |
| 5,750,214 | 5/1998 | Ito et al. | 428/1 |
| 5,790,223 | 8/1998 | Hanyu et al. | 349/184 |
| 5,835,248 | 11/1998 | Hanyu et al. | 359/76 |
| 5,841,497 | 11/1999 | Sato et al. | 349/128 |
| 5,858,269 | 1/1999 | Shinjo et al. | 252/299.01 |
| 5,858,273 | 1/1999 | Asaoka et al. | 252/299.4 |
| 5,885,482 | 3/1999 | Asaoka et al. | 252/299.01 |
| 5,932,136 | 8/1999 | Terada et al. | 252/299.01 |

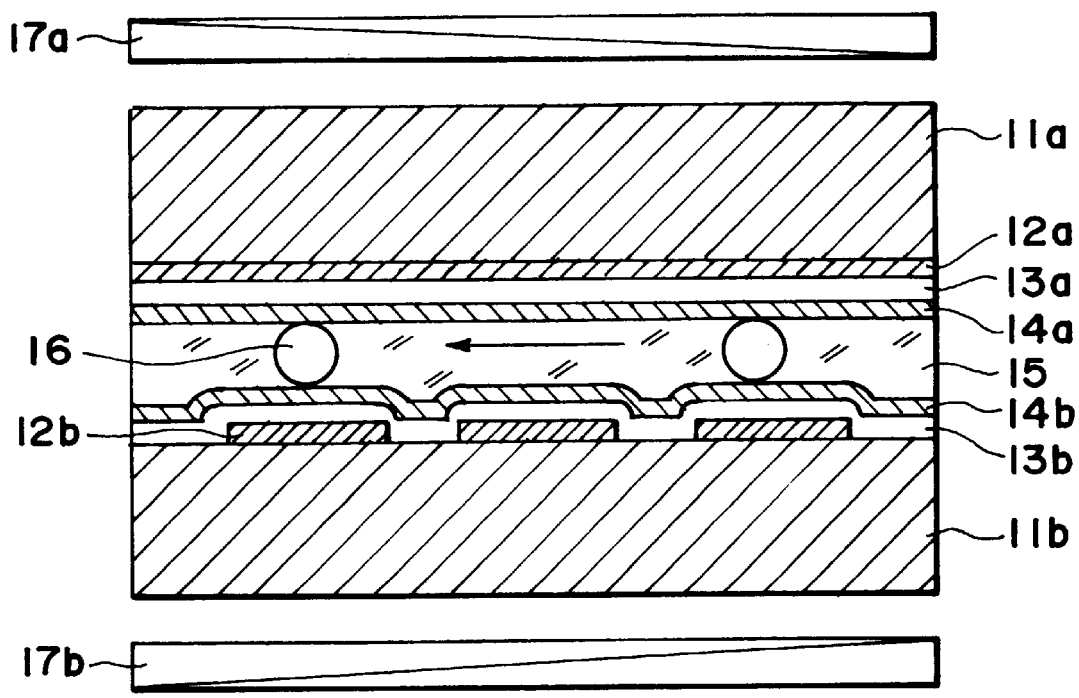
F I G. 1

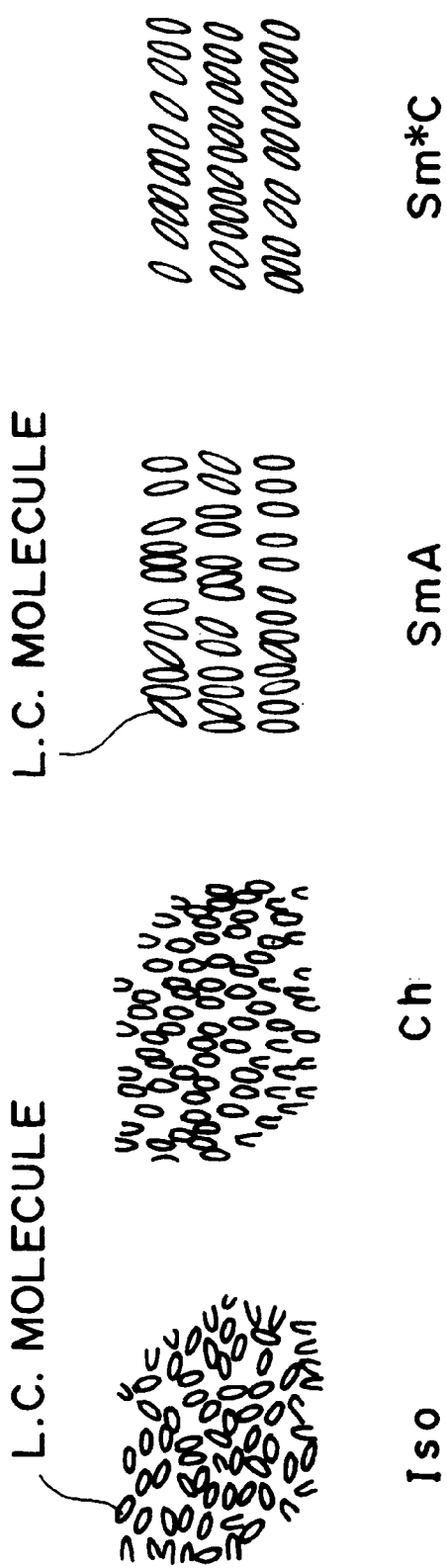

FIG. 6AA
FIG. 6AB
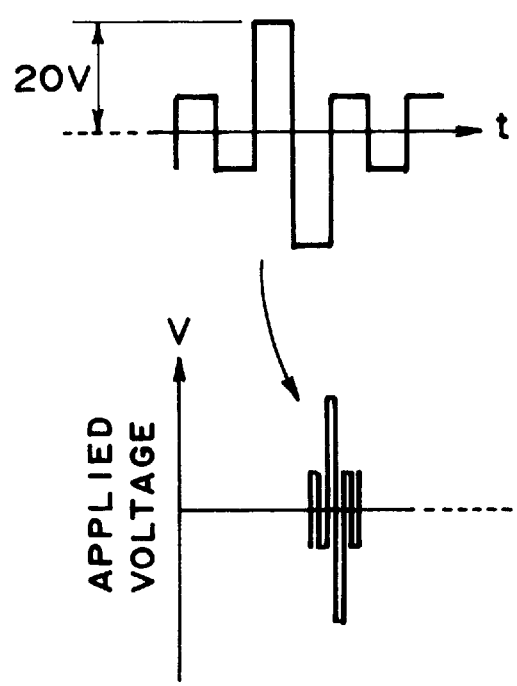
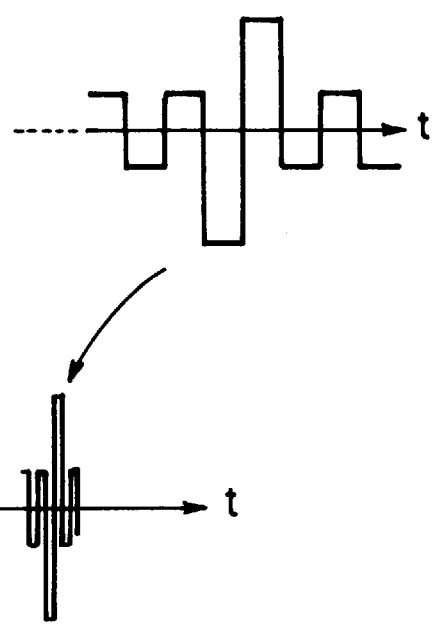
FIG. 6A
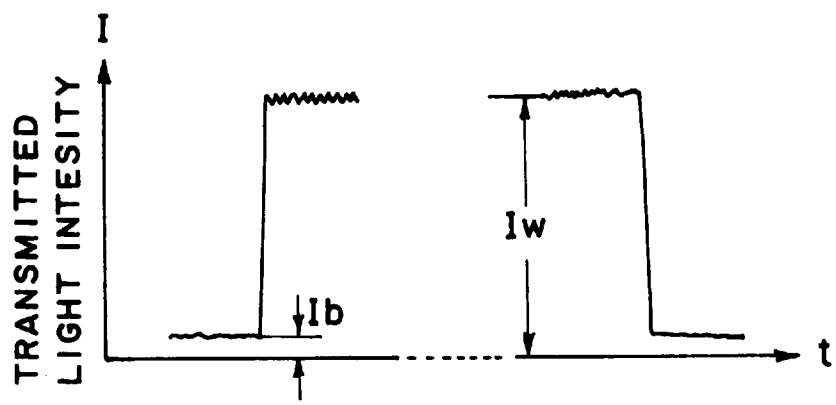
FIG. 6B

LIQUID CRYSTAL DEVICE

FIELD OF THE INVENTION AND RELATED ART

The present invention relates to a liquid crystal device using a chiral smectic liquid crystal composition for use in computer terminal displays, various flat panel displays for word processors, type writers and television receivers, video camera view finders, light valves for projectors, light valves for liquid crystal printers, etc.

The most popular and extensively used display may be CRTs (cathode ray tubes) which have been widely used for displaying motion pictures of television and video tape recorders or as monitor displays for personal computers. Based on the operation characteristic, the CRT is accompanied with difficulties such that the recognizability of a static image is lowered due to flickering and scanning fringes caused by an insufficient resolution, and the fluorescent member is deteriorated due to burning. Further, it has been recently found that electromagnetic wave emitted from CRTs can adversely affect human bodies and health of VDT operators. Further, the CRT structurally has a large rearward space behind the display surface, so that the space economization in offices and at home may be obstructed thereby.

As a type of device solving such problems of the CRT, there has been known a liquid crystal device, including a type using a twisted nematic (TN) liquid crystal as disclosed by M. Schadt and W. Helfrich, "Applied Physics Letters", Vol. 18, No. 4 (Feb. 15, 1971), pp. 127–128.

The liquid crystal device using a TN-liquid crystal includes a simple matrix-type liquid crystal device which is advantageous from a viewpoint of production cost. This type of liquid crystal device is however accompanied with a problem that it is liable to cause crosstalk when driven in a multiplex manner by using an electrode matrix of a high pixel density, and therefore the number of pixels is retracted.

In contrast with such a simple matrix-type liquid crystal device, a TFT-type liquid crystal device has been developed in recent years, wherein each pixel is provided with and driven with a TFT (thin film transistor). As a result, the problems of crosstalk and response speed can be solved but, on the other hand, a larger area device of the type poses an extreme difficulty in industrial production thereof without inferior pixels. Further, even if such production is possible, the production cost can be increased enormously.

For providing improvements to the above-mentioned difficulties of the conventional types of liquid crystal devices, a liquid crystal device of the type which controls transmission of light in combination with a polarizing device by utilizing a refractive index anisotropy of chiral smectic liquid crystal molecules, has been proposed by Clark and Lagerwall (Japanese Laid-Open Patent Application (JP-A) 56-107216, U.S. Pat. No. 4,367,924). The chiral smectic liquid crystal generally has chiral smectic C phase (SmC*) or H phase (SmH*) in a specific temperature range and, in the phase, shows a property of assuming either one of a first optically stable state and a second optically stable state in response to an electric field applied thereto and maintaining such a state in the absence of an electric field, namely bistability, and also have a very quick response speed because it causes inversion switching based on its spontaneous polarization. Thus, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area. Further, an anti-ferroelectric liquid crystal device using a chiral smectic liquid crystal showing three stable states has been proposed recently by Chandani, Takezoe, et al (Japanese Journal of Applied Physics, Vol. 27, No. 5, May 1988, page L729–L732).

Such a chiral smectic liquid crystal is accompanied with problems, such as the occurrence of zigzag-shaped alignment defects and twisting of liquid crystal molecules between a pair of substrates (called "splay alignment") leading to a lowering in contrast (as described in, e.g., "Structures and Properties of Ferroelectric Liquid Crystals" (in Japanese) authored by Atsuo Fukuda and Hideo Takezoe; Corona Publishing Co., Ltd., Tokyo, Japan, (1990)). The defects are considered to be attributable to a layer structure of a chiral smectic liquid crystal including two types of chevron structures between a pair of substrates.

A known method of solving the above problem is to provide the liquid crystal molecules with a pretilt angle, thereby uniformizing the chevron layer structure in one direction so that the twisting state (splay alignment state) of liquid crystal molecules between the pair of substrate is made more unstable than a uniform alignment state in respect of elastic energy.

Another method is to form a liquid crystal layer structure not of the bent chevron structure but of a bookshelf structure wherein smectic layers are little inclined but aligned generally in parallel or a structure close thereto, thereby removing the zigzag defects and realizing the uniform alignment to provide a high contrast (as disclosed in, e.g., "Future Liquid Crystal Display and Its Materials", edited by Atsuo Fukuda; K. K. C. M. D., (1992)). In a method of realizing a bookshelf layer structure, a naphthalene-type liquid crystal material is used. In this case, however, the resultant tilt angle is on the order of 10 deg. and is much smaller than 22.5 deg. which theoretically provides a maximum transmittance, so that the device can exhibit only a low transmittance. Another method is to apply an external electric field to a liquid crystal device containing a liquid crystal in a chevron structure to induce a bookshelf structure, but the resultant structure is rather unstable against an external stimulation, such as a temperature fluctuation.

As a liquid crystal material providing a bookshelf structure or a structure close thereto, a mesomorphic compound having a perfluoroalkyl ether terminal chain (U.S. Pat. No. 5,262,082), a liquid crystal composition containing such a mesomorphic compound (Marc D. Raddiffe et al., The 4th International Ferroelectric Liquid Crystal Conference, p-46 (1993)), etc. have been proposed. By using such a liquid crystal material, it is possible to provide a bookshelf structure or a similar structure having a small layer inclination angle with an optimum tilt angle without using an external field, such as an electric field.

However, such a liquid crystal material does not generally assume cholesteric phase. As a result, when a liquid crystal device is formed by disposing such a liquid crystal material or a liquid crystal composition containing the material between a pair of substrates at least one of which has thereon an alignment control layer (e.g., polyimide film known for the chiral smectic liquid crystal device) subjected to a prescribed uniaxial aligning treatment (e.g., rubbing), the liquid crystal alignment state cannot be sufficiently controlled, thus being desired to provide an aligning control method or means effective in providing a good alignment state.

In recent years, as a chiral smectic liquid crystal, an antiferroelectric liquid crystal showing three stable states has attracted notice.

The antiferroelectric liquid crystal causes, similarly as in the ferroelectric liquid crystal, inversion switching under the action of spontaneous polarization of liquid crystal molecules, thus providing a very quick response speed. This liquid crystal material has a molecular orientation (alignment) structure under no voltage application such that opposite (two) spontaneous polarization of liquid crystal molecules counterbalance (cancel out) each other, thus being characterized by substantially no spontaneous polarization under no voltage application.

The above-mentioned ferroelectric and antiferroelectric liquid crystals causing inversion switching due to their spontaneous polarizations both belong to a liquid crystal material showing chiral smectic phase, thus being expected to realize a chiral smectic liquid crystal device having solved the problems in terms of response speed (of the conventional nematic liquid crystal devices).

In quite recent years, there have been proposed some display or driving modes allowing control of gradation levels using a chiral smectic liquid crystal material, such as a ferroelectric liquid crystal of a short pitch-type, a stabilized polymer-type ferroelectric liquid crystal or an antiferroelectric liquid crystal providing no threshold value.

Accordingly, in liquid crystal devices using an antiferroelectric liquid crystal or of a gradation display mode, a method or means for well aligning the chiral smectic liquid crystal material is required.

SUMMARY OF THE INVENTION

In view of the above-mentioned circumstances, a principal object of the present invention is to provide a liquid crystal device, particularly a chiral smectic liquid crystal device, wherein a chiral smectic liquid crystal for various display (or driving) modes is caused to have a stable alignment state, thereby to exhibit excellent performances, inclusive of a high contrast, a quick response speed, a high resolution and a high brightness.

Another object of the present invention is to provide a display apparatus including such a liquid crystal device showing excellent display characteristics including a high contrast, a high resolution and a high brightness, and having a large display area.

Another to the present invention, there is provided a liquid crystal device, comprising: a pair of substrates each provided with an electrode, and a chiral smectic liquid crystal composition disposed between the substrates.

wherein at least one of the substrates is provided with an alignment control film of a polyimide represented by the following formula (I):

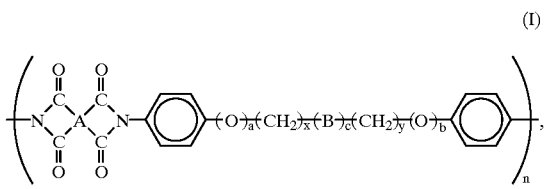

(I)

in which A denotes a planar tetravalent organic residue group; B denotes a divalent group represented by —$CR_1(R_2)$— where $R_1$ and $R_2$ independently denote H or alkyl group; a, b and c are independently 0 or 1, preferably a=b=1 or a=b=c=0; x and y are independently an integer of at least 0, preferably at least 1, and x+y=at least 2, and n is an integer of at least 2.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of an embodiment of the liquid crystal device using a chiral smectic liquid crystal according to the present invention.

FIGS. 2A–2D are schematic illustrations of liquid crystal molecular alignment states in respective liquid crystal phases.

FIG. 6A is a waveform diagram showing two types of applied voltage waveform used for determining a contrast adopted in Examples appearing hereinafter; FIG. 6B is an illustration of resultant transmitted light intensities through the device; and FIGS. 6AA and 6AB are enlarged illustrations of the two types of applied voltage waveforms shown in FIG. 6A.

DETAILED DESCRIPTION OF THE PREFERRED EMBODIMENTS

Figures 3A, 3B, 3C, 3D:
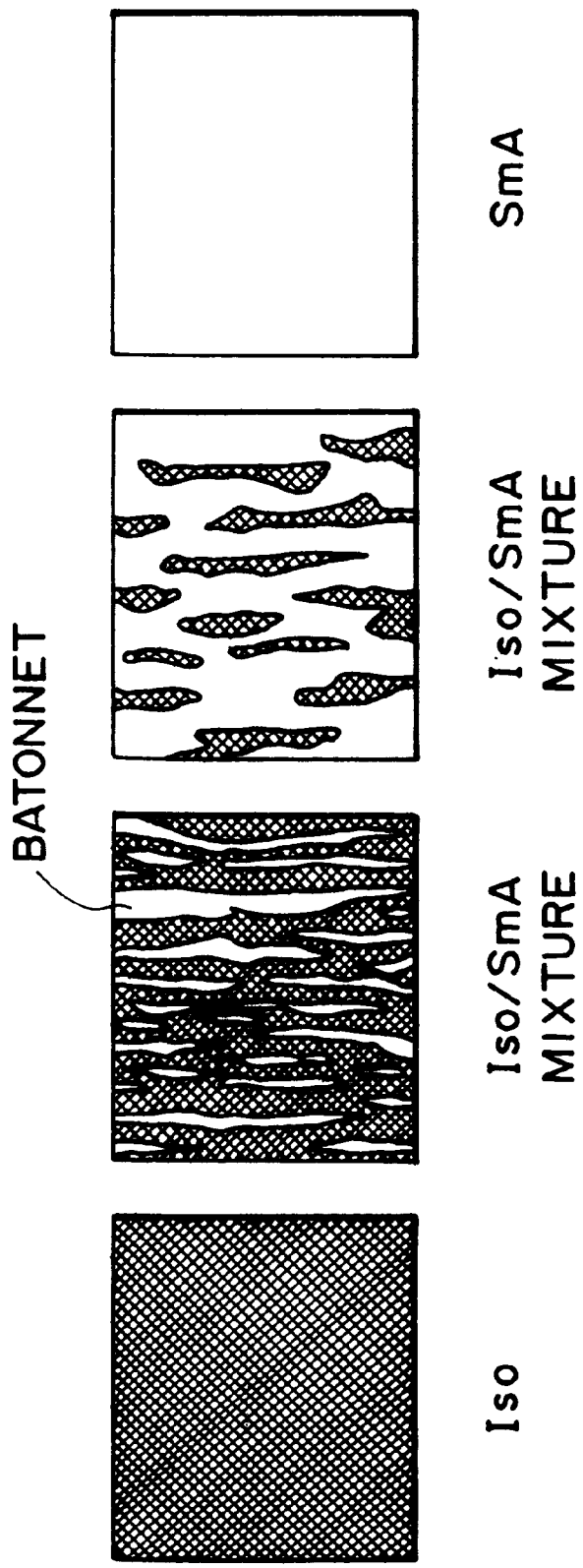
FIGS. 3A–3D are schematic illustrations of states of phase transition of Iso (isotropic) phase to SmA (smectic A) phase of a liquid crystal material lacking Ch (cholesteric) phase.

Hereinbelow, a cell structure of a preferred embodiment of the liquid crystal device according to the present invention will be described with reference to FIG. 1.

Referring to FIG. 1, the liquid crystal device includes a pair of glass substrates 11a and 11b having thereon transparent electrodes 12a and 12b, respectively, of tin oxide, indium oxide, indium tin oxide (ITO), etc., and further insulating films 13a and 13b, respectively, functioning as a short circuit prevention layer of ZnO, ZrO, TaO$_x$, TiO$_2$, SiO$_2$ or mixtures of these materials. The substrate 11a is further provided with an alignment control film (alignment control layer) 14a of a film of a polyimide represented by the above-mentioned formula (I) and subjected to a uniaxial aligning treatment, such as rubbing in an arrow direction. The substrate 11b is provided with an alignment control film 14b. A material for the alignment control film 14b and treatment conditions therefor may appropriately be selected depending on a liquid crystal mode used, particularly properties of a chiral smectic liquid crystal material used and a correlation with the uniaxially aligning-treated alignment control film 14a. If the chiral smectic liquid crystal material shows no cholesteric (chiral nematic) phase (as specifically described hereinafter), the alignment control film 14b may preferably be of silane coupling agent, polyimide, polysiloxane, etc., not subjected to a uniaxial aligning treatment. In the case of using a chiral smectic liquid crystal material showing cholesteric phase, the alignment control film 14b may preferably be a polyimide film of the formula (I) subjected to a uniaxial aligning treatment. Similarly as the alignment control film 14a formed on the substrate 11a. The substrates 11a and 11b are disposed opposite to each other with spacer beads 16 of, e.g., silica or alumina and sealed at periphery thereof with a sealant (not shown) to leave a space therebetween, which is filled with a chiral liquid crystal composition constituting a liquid crystal layer 15. The thus-formed cell structure is sandwiched between a pair of polarizers 17a and 17b to form a liquid crystal device.

In the liquid crystal device of the above-described structure, the transparent electrodes 12a and 12b may be connected to a signal power supply (not shown) so as to effect switching depending on switching signals from the signal power supply. The liquid crystal device may function as a light valve of a display device, etc. Further, if transparent electrodes 12a and 12b are provided respectively in pluralities so as to form a cross matrix electrode structure, a pattern display or exposure becomes possible to provide displays for a personal computer, a wordprocessor, etc., or a light value for a printer, etc.

In the liquid crystal device of the above-mentioned structure, at least one of the alignment control layers 14a and 14b may comprise a uniaxially aligning-treated film, preferably a rubbed film, of the polyimide (having the recurring unit of the formula (I) described above) which has been formed by application of a polyamic acid and baking thereof.

The polyimide used for the alignment control film 14a and/or the alignment control film 14b in the present invention, as shown in the structural formula (I), is characterized by a particular chemical structure including the A portion having a planar structure and a diamine skeleton portion having two phenylene groups apart from each other via an alkylene-based linkage. The polyimide alignment control film(s) (14a and/or 14b) well interacts with the chiral smectic liquid crystal (composition) used, thus showing a strong alignment controlling force.

In the formula (I) (representing the recurring unit of the polyimide), the planar tetravalent organic residue group A may include:

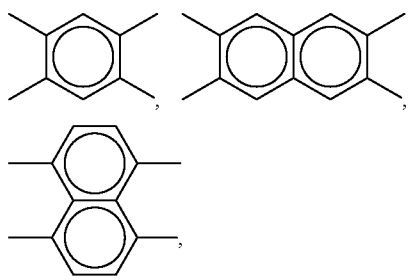

-continued

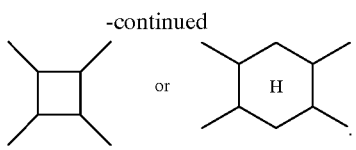

Examples of the diamine skeleton portion may include:

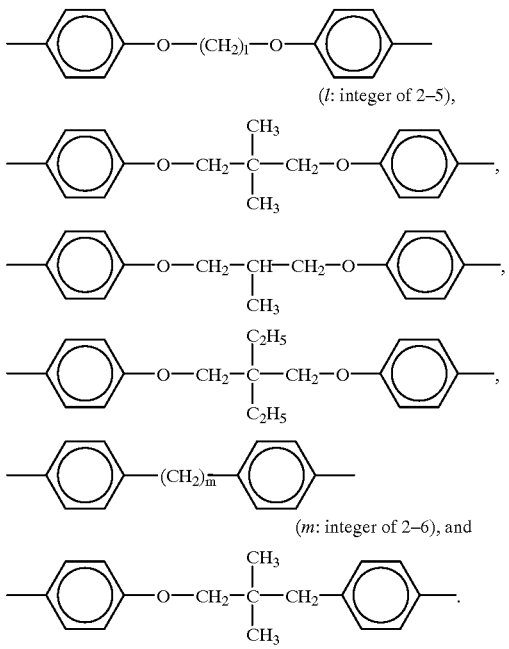

The polyimide of the formula (I) may preferably have a structure such that the tetravalent organic residue group A substantially provide a main chain of the polyimide with a linearity and symmetric structure with respect to a line perpendicular to the extension direction of the main chain.

The polyimide used in the present invention may generally be prepared by effecting a polycondensation reaction between a tetracarboxylic anhydride having the planar tetravalent organic residue group A and a diamine having the diamine skeleton portion mentioned above to form a polyamic acid, followed by ring closure thereof under heating. The polyimide may be prepared by using at least two species of tetracarboxylic anhydrides and/or diamines and may be in mixture of at least two different polyimides.

In the present invention, the uniaxially aligning-treated alignment control film(s) (14a and/or 14b) of the polyimide film having the above-mentioned particular structure may suitably be used in combination with the chiral smectic liquid crystal material, particularly showing no cholesteric phase, thus providing the chiral smectic liquid crystal material with a uniform alignment state.

Hereinbelow, a mechanism for aligning the chiral smectic liquid crystal material lacking characteristic phase will be described specifically.

A chiral smectic liquid crystal disposed between a pair of oppositely disposed substrates may develop bistability in its Sm* phase (chiral smectic phase, typically SmC* (chiral smectic C) phase), which is formed by gradual cooling from its liquid phase (isotropic phase). Accordingly, the alignment state in chiral smectic phase is greatly affected by a phase transition series between the isotropic phase and the chiral smectic phase. In view of the thermodynamic stability, the phase transition series may include the following four types:

(1) Iso——Ch(N*)——SmA——SmC*, (2) Iso————————SmA——SmC*, (3) Iso——Ch(N*)————————SmC*, and (4) Iso————————————SmC*, wherein Iso denotes isotropic phase; Ch(N*), cholesteric (i.e., chiral nematic) phase; and SmA, smectic A phase. The liquid crystal alignment states in the respective phases are schematically illustrated in FIGS. 2A–2D. In the case of a liquid crystal material having the phase transition series (1), a liquid crystal molecule long axis order is determined at Iso—Ch transition, a liquid crystal molecule positional order (layer structure) is determined at Ch—SmA transition, and a liquid crystal molecule tilt is developed at SmA—SmC* transition, so that a uniform alignment can be easily obtained because of such a sequential order determination. In contrast thereto, in the cases of liquid crystal having the phase transition series (2), (3) and (4), it becomes difficult to realize a uniform alignment because plural orders having to be determined simultaneously, i.e., simultaneous determination of molecular long axis order and layer structure for (2); simultaneous determination of layer structure and tilting of liquid crystal molecules for (3); and simultaneous determination of molecular long-axis order, layer structure and tilting for (4). In the liquid crystal device of the present invention, uniform alignment of a liquid crystal material (composition) having the phase transition series (2) which is suitable for providing a bookshelf structure or a structure close thereto can be realized.

FIGS. 3A–3D are sketches of polarizing microscopic observation by us of stages of Iso—SmA phase transition. According to our observation during the transition from isotropic (Iso) phase to smectic A (SmA) phase, islands of SmA (hereinafter called "batonnets") having an almost spheroidal shape are first generated and are joined together to complete the phase transition. Further, it is also observed that alignment defects occur in a liquid crystal (particularly in a liquid crystal cell) when the batonnets grow in random directions or due to joint failure between batonnets.

The mechanism for occurrence of such alignment defects has not been fully clarified as yet, but it has been found possible to provide a defect-free, uniform and good alignment structure by disposing a liquid crystal composition having the above-mentioned phase transition series (2) and liable to cause alignment defects as described above between a pair of substrates, at least one of which is provided with an alignment control film comprising a polyimide having a recurring unit of the above-mentioned formula (I) and subjected to a uniaxial aligning treatment, such as rubbing. This may be attributable to factors such that the polyimide having the recurring unit of the formula (I) can be readily stretched during a uniaxial aligning treatment and causes a large electron density anisotropy in the layer after the aligning treatment to exert a strong alignment control force to the liquid crystal having the above-mentioned phase transition series (2).

As such a liquid crystal material having the phase transition series (2) lacking cholesteric (Ch) phase, it is possible to use a chiral smectic liquid crystal composition having a layer spacing-changing characteristic providing a layer spacing $d_A$ at a first transition point where the layer spacing of the liquid crystal composition begins to decrease abruptly or at a discontinuously larger decrease rate on temperature decrease in vicinity of a transition temperature from smectic A phase to chiral smectic C phase and a layer spacing $d_{min}$ at a second transition point where the layer spacing of the liquid crystal composition begins to increase on further temperature decrease from the first transition point, wherein $0.990 \leq d_{min}/d_A$. The chiral smectic liquid crystal composition is effection in providing a bookshelf structure or a structure close thereto in chiral smectic phase when used in a liquid crystal device and shows a good alignment state by effecting aligning treatment with the polyimide alignment control film of the formula (I) described above, thus providing a high contrast.

The chiral smectic liquid crystal composition may desirably contain a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20; and pa is 0–4; or a group represented by —$D^2$—$(C_{xb}F_{2xb}$—O$)_{za}$— $C_{ya}F_{2ya+1}$, wherein xb is 1–10 independently for each ($C_{xb}F_{2xb}$—O); ya is 1–10; za is 1–10; —$D^2$— is —CO—O—$C_{rc}H_{2rc}$, —O—$C_{rc}H_{2rc}$— —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$—, —$C_{rc}H_{2rc}$—N($C_{pb}H_{2pb+1}$)—CO—, or a covalent bond, where rc and rd are independently 1–20; sa is independently 1–10 for each ($C_{sa}H_{2sa}$—O); ta is 1–6; and pb is 0–4.

The fluorine-containing mesomorphic compound may preferably have a central core comprising at least two rings independently selected from aromatic, heteroaromatic, cycloaliphatic, or substituted aromatic, heteroaromatic, or cycloaliphatic rings, connected one with another by a single bond or a divalent group selected from —COO—, —COS—, —HC=N—, —COSe—. Rings may be fused or non-fused. Heteroatoms within the heteroaromatic or substituted heteroaromatic ring comprise at least one atom selected from N, O or S. Non-adjacent methylene groups in (substituted) cycloaliphatic rings may be substituted by O atoms.

It is particularly preferred to use a fluorine-containing mesomorphic compound of the following general formula (II) or general formula (III):

Formula (II):

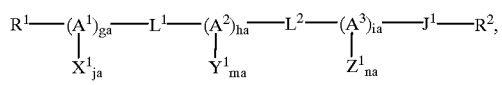

wherein $A^1$, $A^2$ and $A^3$ are each independently

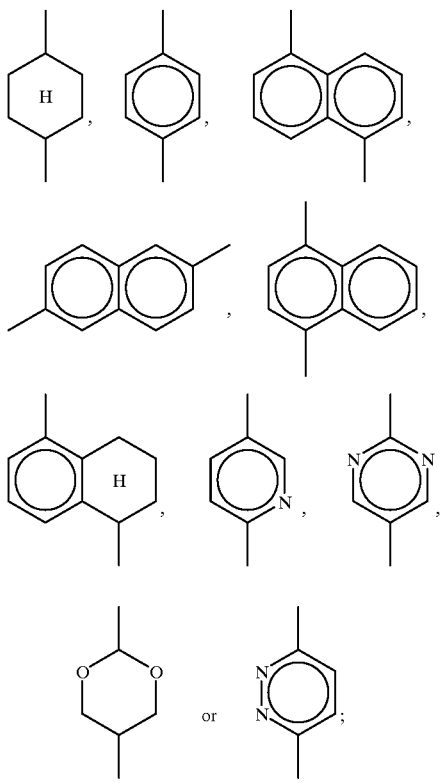

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{21qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is C$_{xa}$F$_{2xa}$—X, where X is —H or —F, xa is an integer of 1–20.

Formula (III):

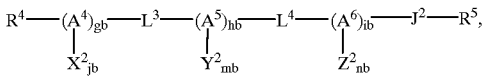

wherein $A^4$, $A^5$ and $A^6$ are each independently

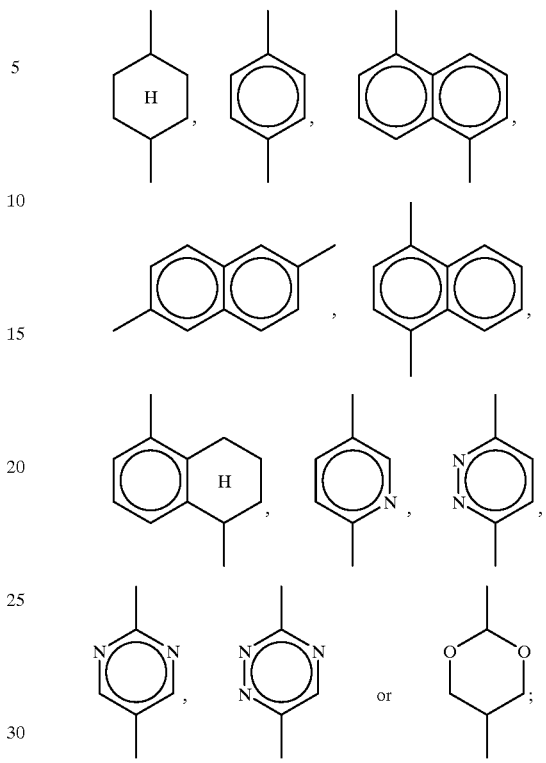

gb, hb and ib are each independently an integer of 0—3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

The compounds represented by the general formula (II) may be obtained through a process described in U.S. Pat. No. 5,082,587 (corr. to JP-A 2-142753). Specific examples thereof are enumerated below.

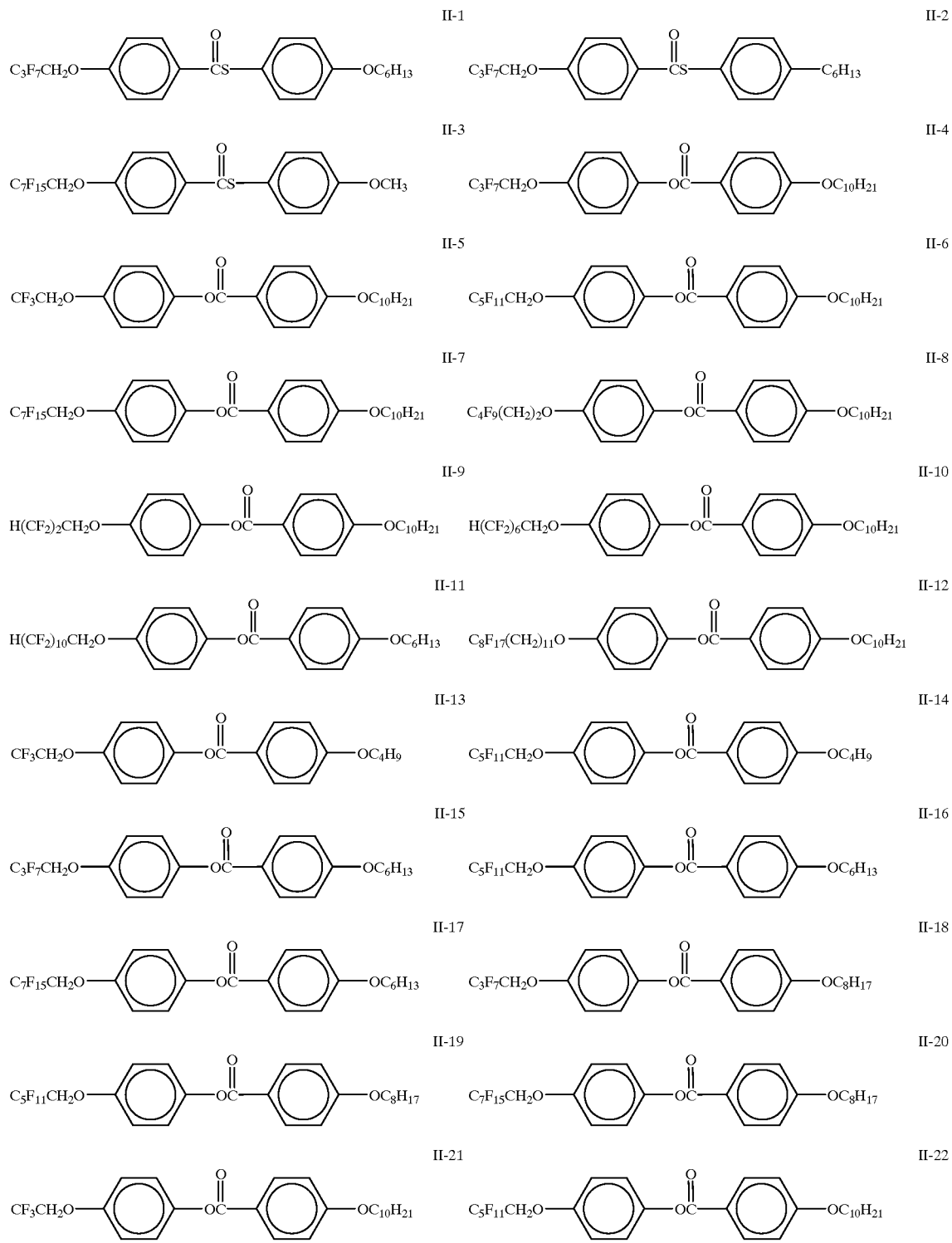

-continued

II-23: $C_7F_{15}CH_2O$—⌬—CO—O—⌬—$OC_{12}H_{25}$

II-24: $CF_3CH_2O$—⌬—CO—O—⌬(Cl)—$OC_8H_{17}$

II-25: $CF_3CH_2O$—⌬—CO—O—⌬—$OC_6H_{13}$

II-26: $C_2F_5CH_2O$—⌬—CO—O—⌬—$OC_6H_{13}$

II-27: $C_3F_7CH_2O$—⌬—CO—O—⌬—$OC_6H_{13}$

II-28: $C_3F_7CH_2O$—⌬—CO—O—⌬—$OC_7H_{15}$

II-29: $C_3F_7CH_2O$—⌬—CO—O—⌬—$OC_8H_{17}$

II-30: $C_3F_7CH_2O$—⌬—CO—O—⌬—$OC_{10}H_{21}$

II-31: $C_3F_7CH_2O$—⌬—CO—O—⌬—$OC_{12}H_{25}$

II-32: $C_5F_{11}CH_2O$—⌬—CO—O—⌬—$OC_6H_{13}$

II-33: $C_5F_{11}CH_2O$—⌬—CO—O—⌬—$OC_7H_{15}$

II-34: $C_5F_{11}CH_2O$—⌬—CO—O—⌬—$OC_8H_{17}$

II-35: $C_5F_{11}CH_2O$—⌬—CO—O—⌬—$OC_{10}H_{21}$

II-36: $C_7F_{15}CH_2O$—⌬—CO—O—⌬—$OC_6H_{13}$

II-37: $C_7F_{15}CH_2O$—⌬—CO—O—⌬—$OC_8H_{17}$

II-38: $C_7F_{15}CH_2O$—⌬—CO—O—⌬—$OC_{10}H_{21}$

II-39: $H(CF_2)_2CH_2O$—⌬—CO—O—⌬—$OC_6H_{13}$

II-40: $H(CF_2)_6CH_2O$—⌬—CO—O—⌬—$OC_6H_{13}$

II-41: $C_5F_{11}CH_2O$—⌬(Cl)—CO—O—⌬—$OC_{10}H_{21}$

II-42: $C_5F_{11}CH_2O$—⌬(Cl)—CO—O—⌬—$OC_{10}H_{21}$

II-43: $C_5F_{11}CH_2O$—⌬(Cl)—CO—O—⌬—$OC_8H_{17}$

II-44: $C_5F_{11}CH_2O$—⌬(Cl)—CO—O—⌬—$OC_8H_{17}$

II-45: $C_7F_{15}CH_2O$—⌬(Cl)—CO—O—⌬—$OC_{10}H_{21}$

II-46: $C_7F_{15}CH_2O$—⌬(Cl)—CO—O—⌬—$OC_{10}H_{21}$

-continued
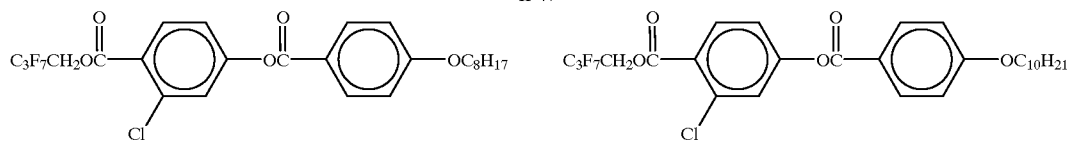
II-47
II-48
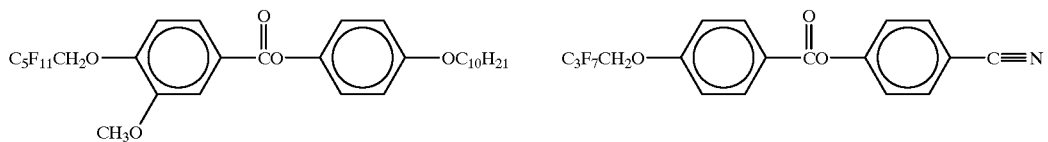
II-49
II-50
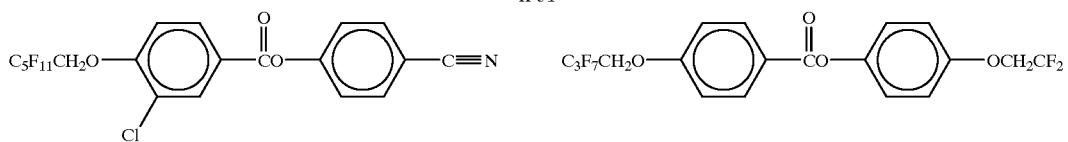
II-51
II-52
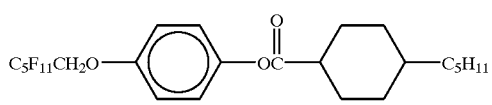
II-53
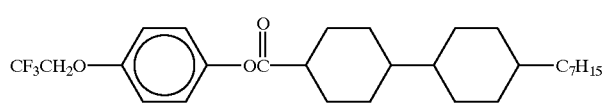
II-54
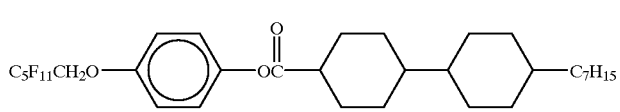
II-55
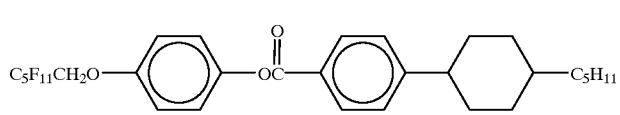
II-56
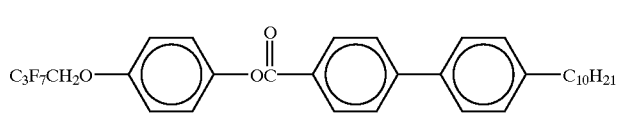
II-57
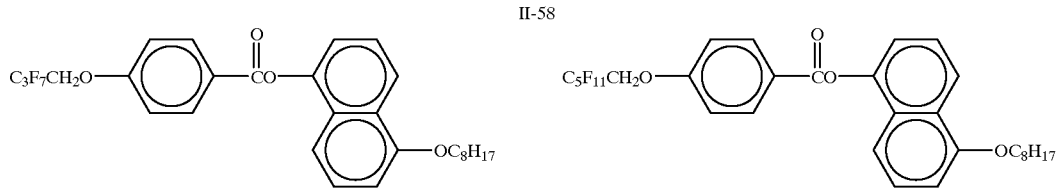
II-58
II-59
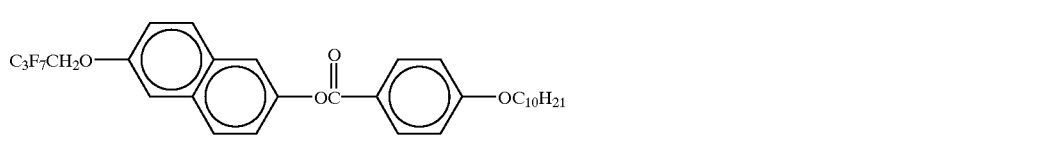
II-60
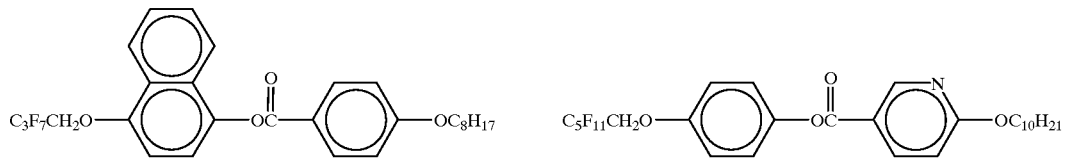
II-61
II-62

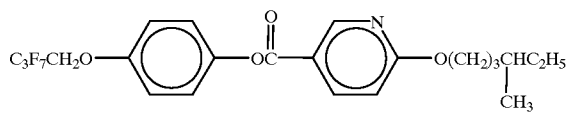
II-63
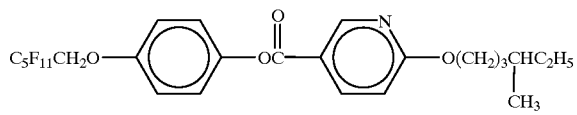
II-64
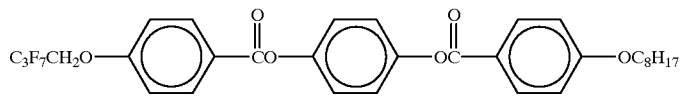
II-65
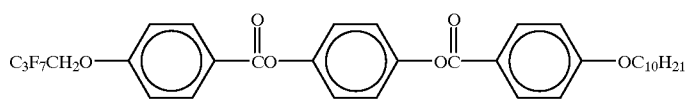
II-66
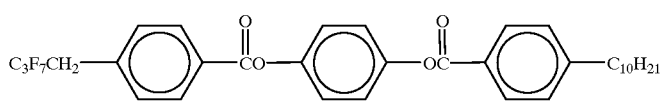
II-67
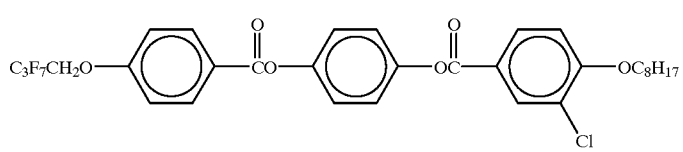
II-68
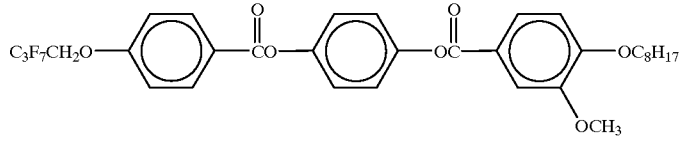
II-69
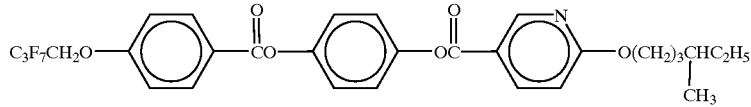
II-70
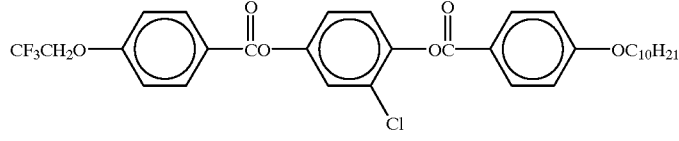
II-71
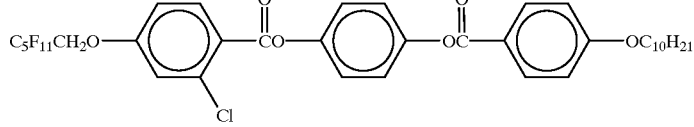
II-72
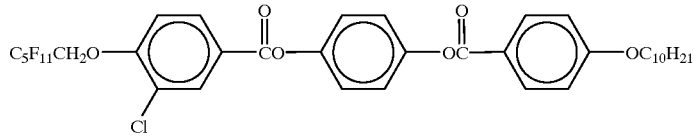
II-73

II-74
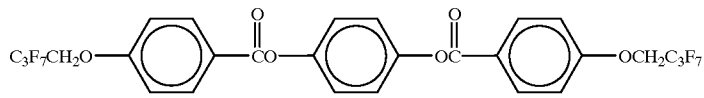
II-75
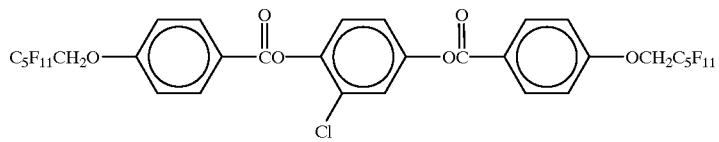
II-76
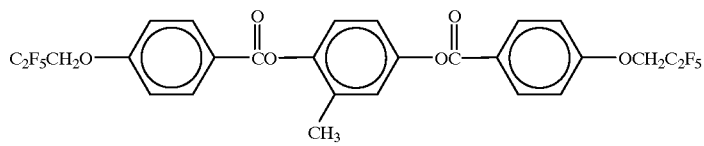
II-77
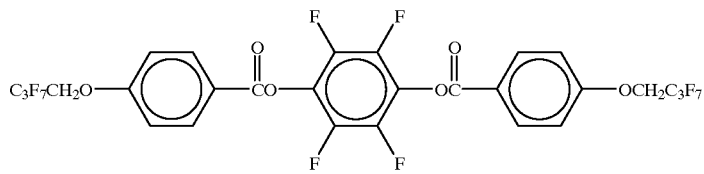
II-78
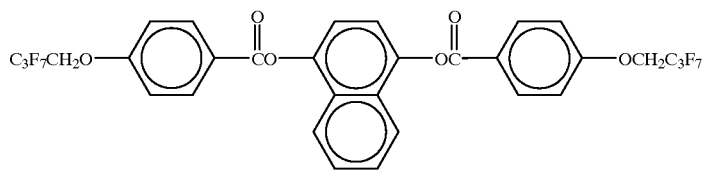
II-79
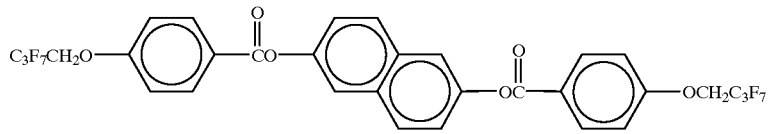
II-80
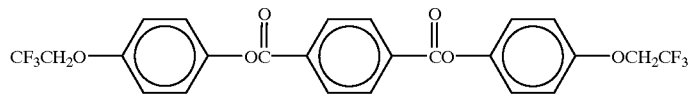
II-81
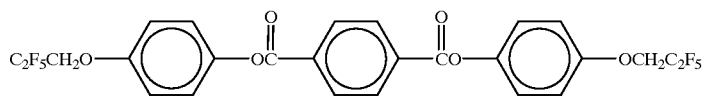
II-82
II-83
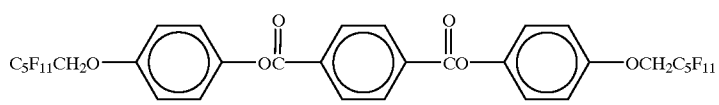
II-84

-continued
II-85
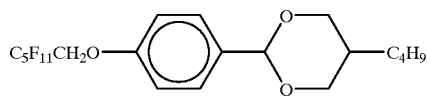
II-86
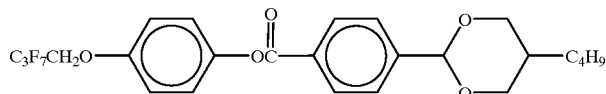
II-87
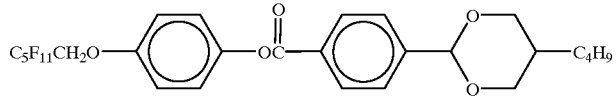
II-88
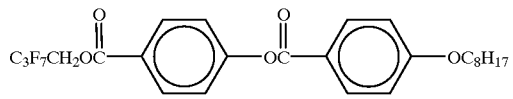
II-89
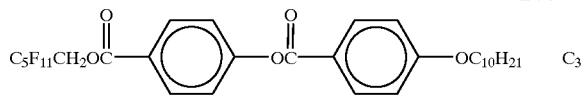
II-90
II-91
II-92
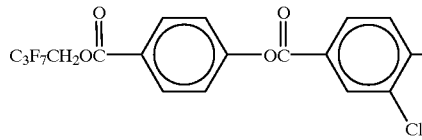
II-93
II-94
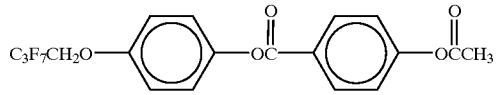
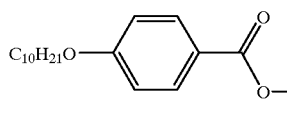
II-95
II-96
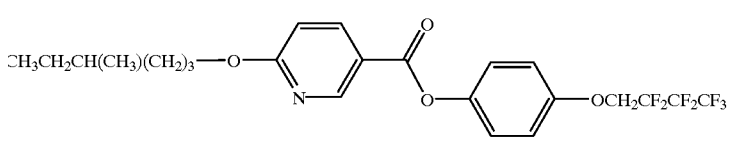
II-97
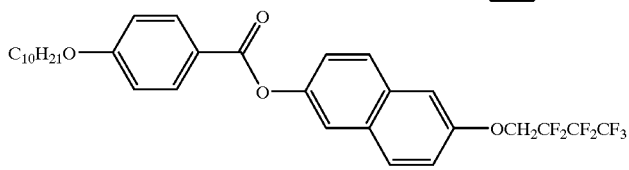
II-98
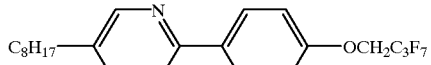
II-99
II-100
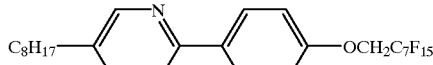
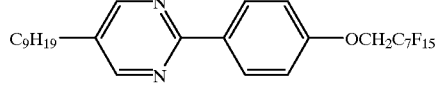
II-101
II-102
II-103
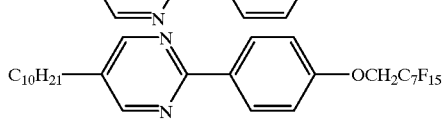

The compounds represented by the general formula (III) may be obtained though a process described in PCT Publication WO93/22396 (corr. to JP (Tokuhyo) 7-506368). Specific examples thereof are enumerated below.
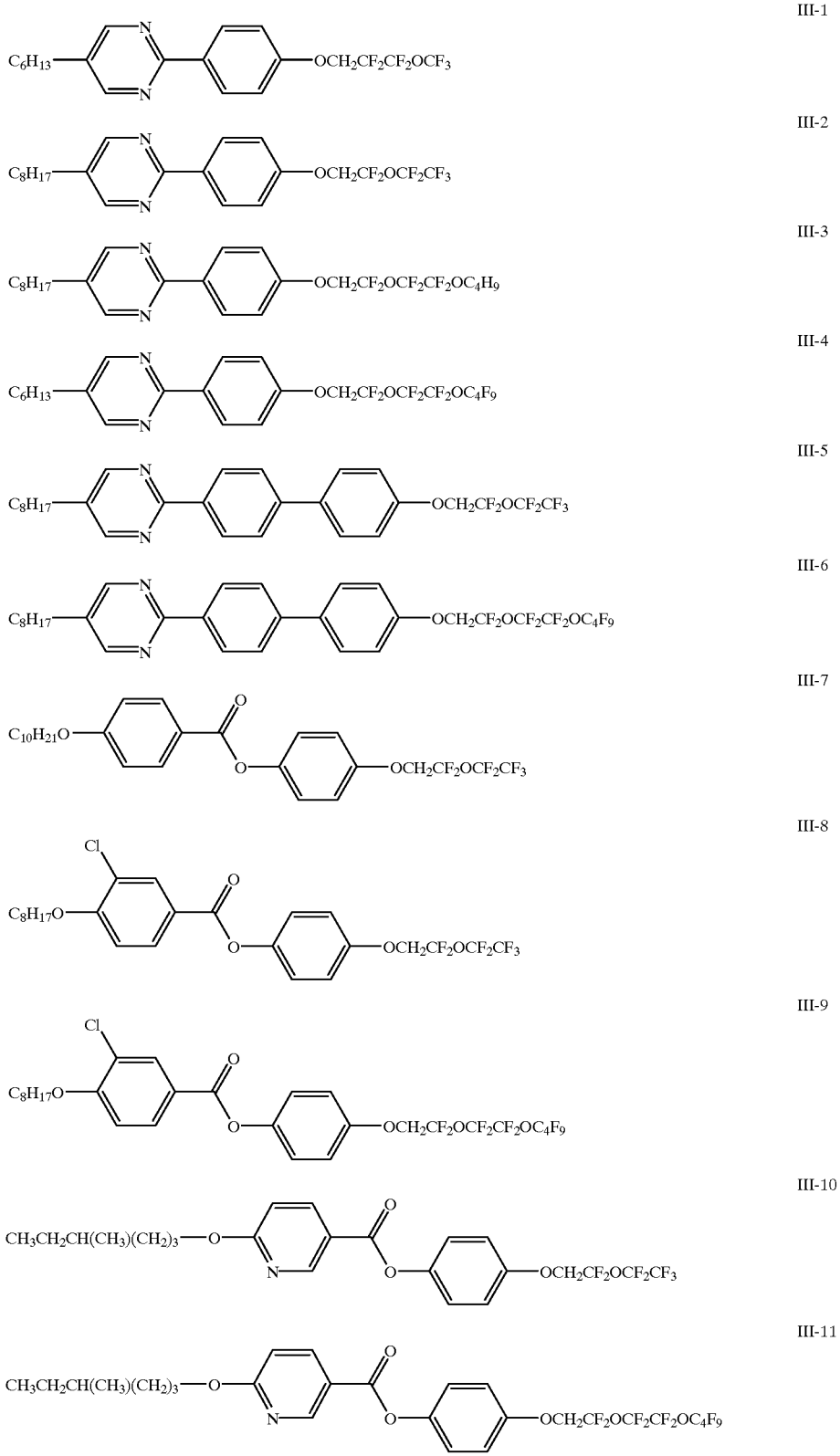

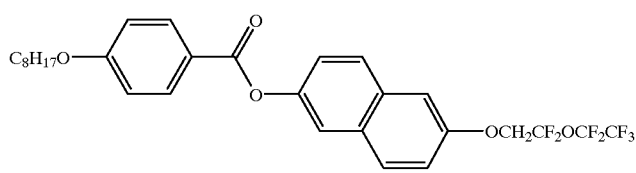
III-12
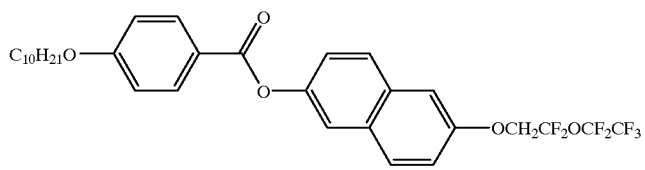
III-13
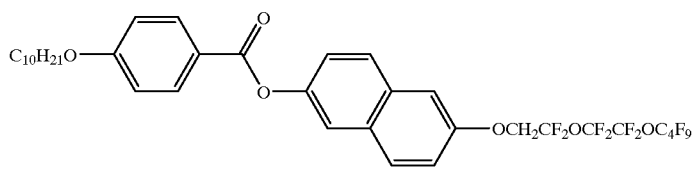
III-14
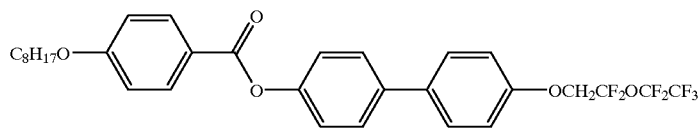
III-15
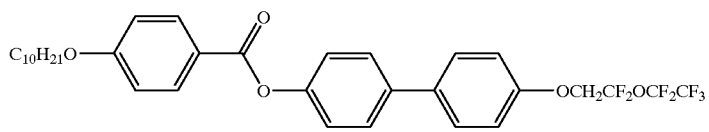
III-16
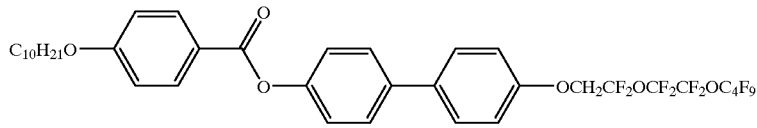
III-17
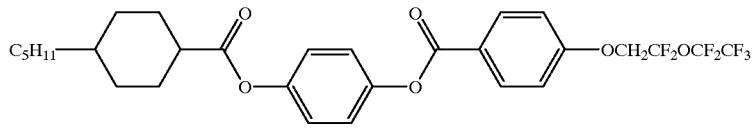
III-18
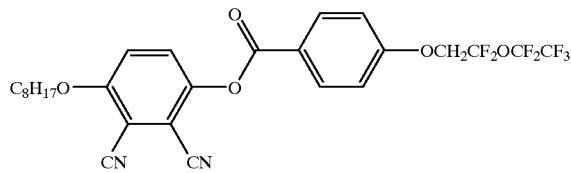
III-19
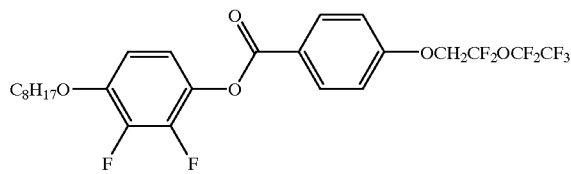
III-20
III-21

-continued
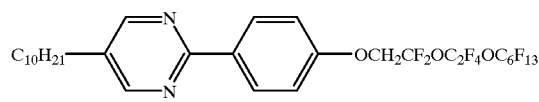 III-22
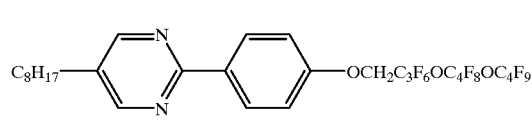 III-23
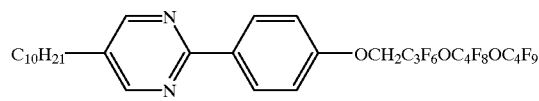 III-24
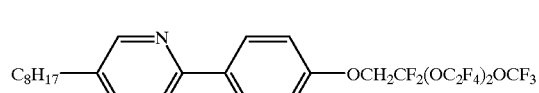 III-25
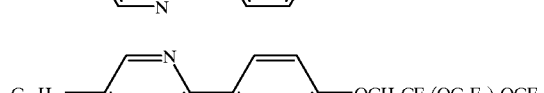 III-26
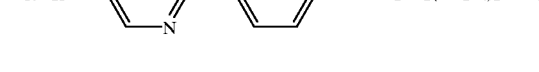 III-27
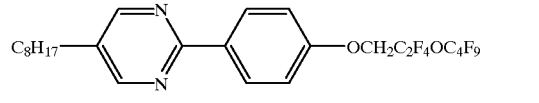 III-28
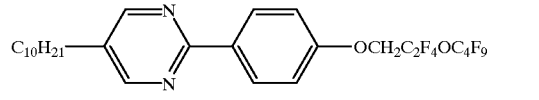 III-29
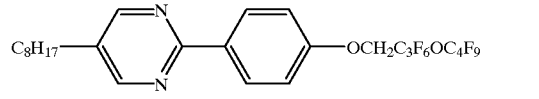 III-30
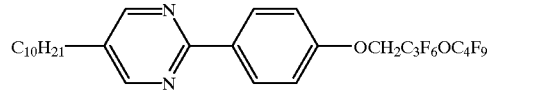 III-31
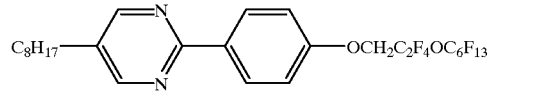 III-32
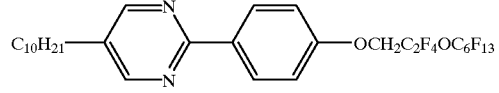 III-33
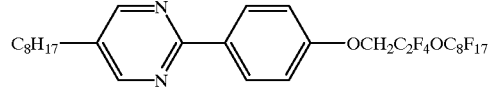 III-34
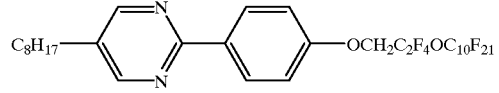 III-35

-continued
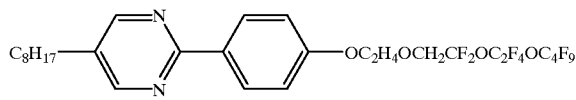
III-36
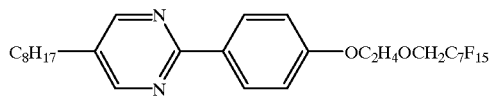
III-37
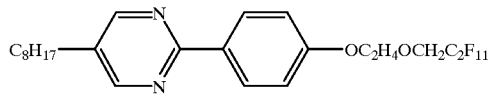
III-38
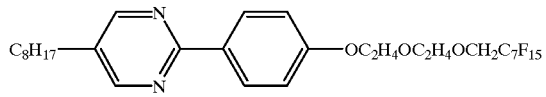
III-39
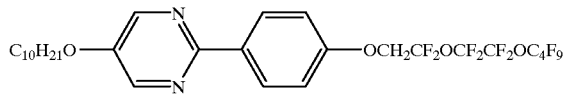
III-40
III-41
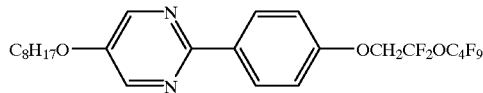
III-42
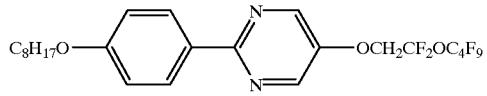
III-43
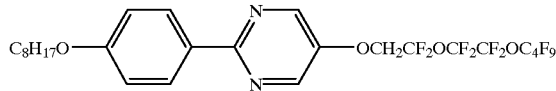
III-44
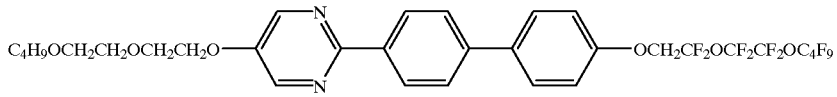
III-45

The chiral smectic liquid crystal composition, particularly containing the fluorine-containing mesomorphic compound of the formula (II) and/or (III) described above, used in the present invention may further contain a chiral compound, examples of which are enumerated below.
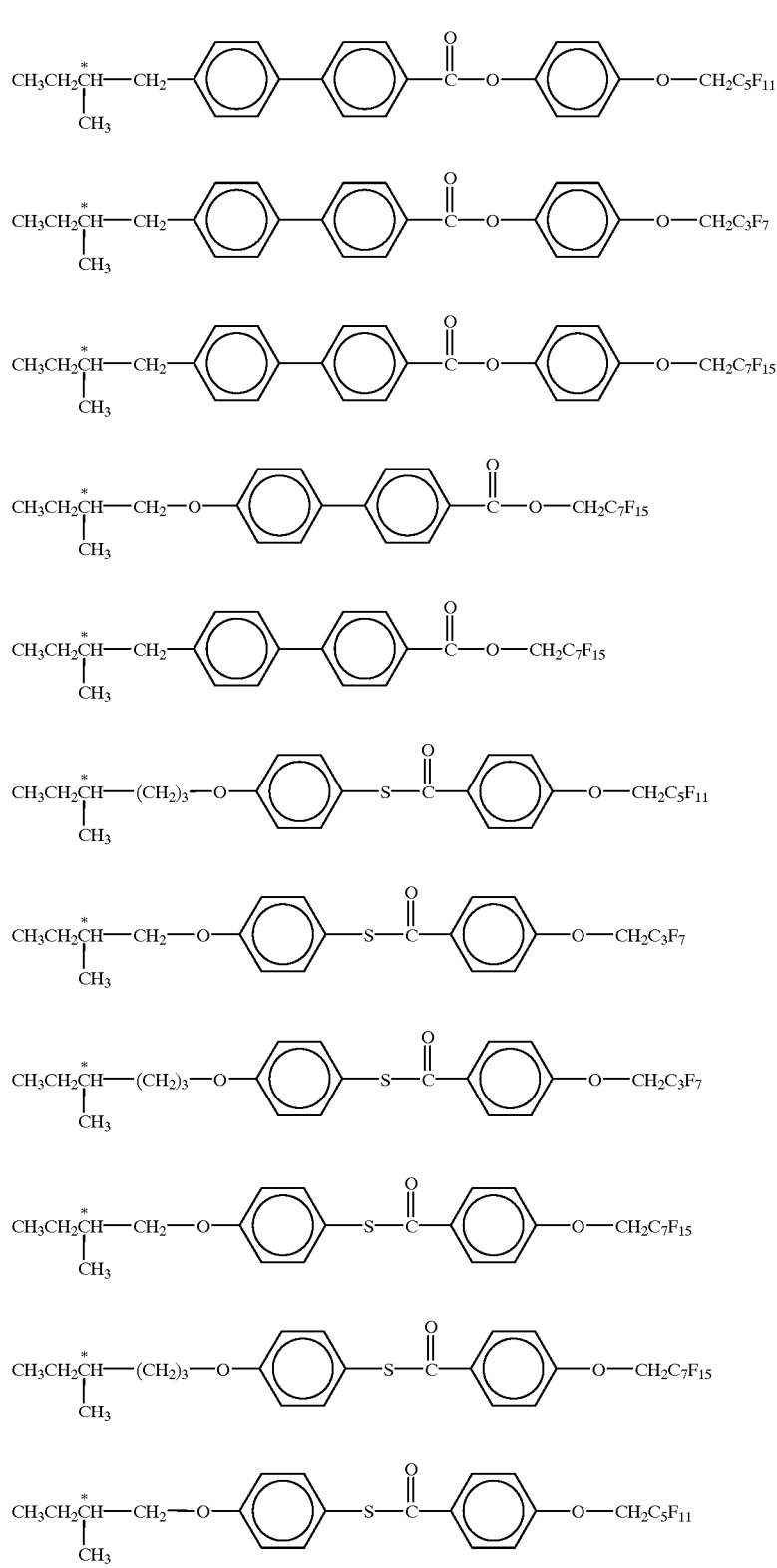

12
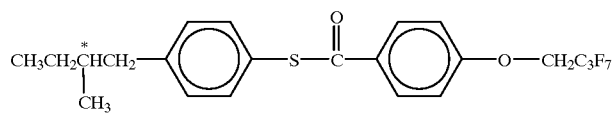
13
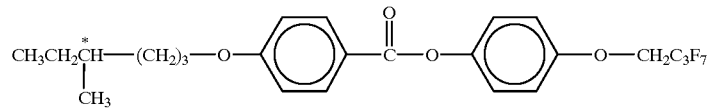
14
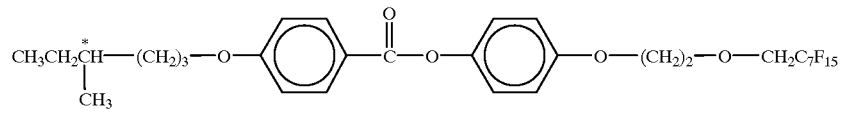
15
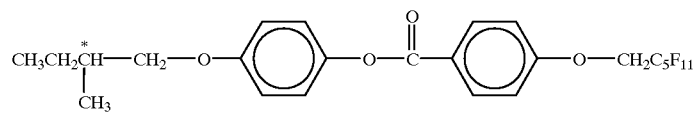
16
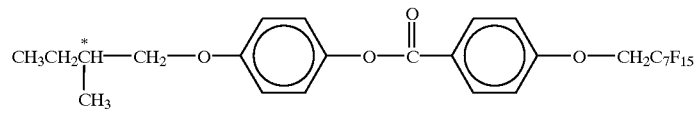
17
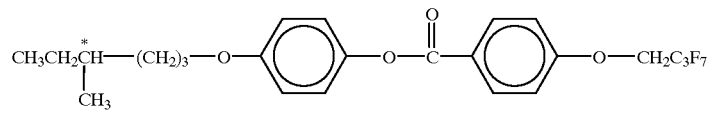
18
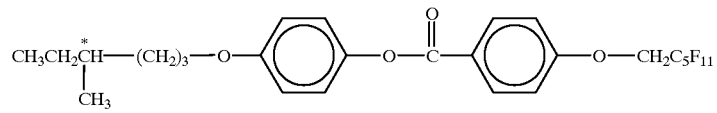
19
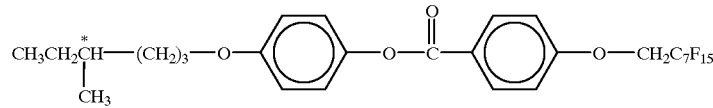
20
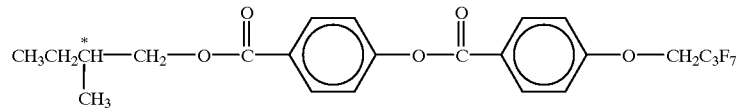
21
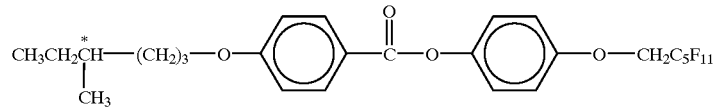
22
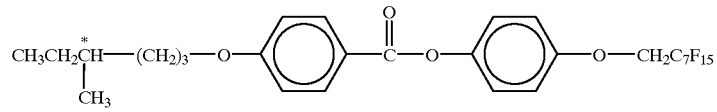
23
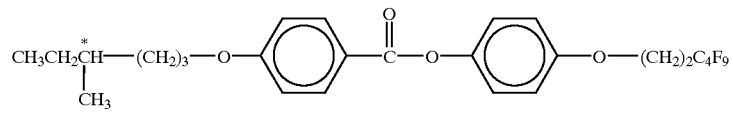

24
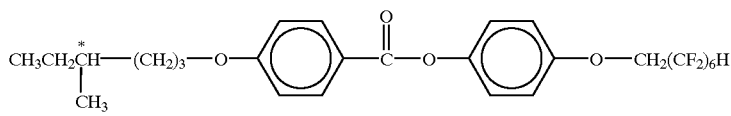
25
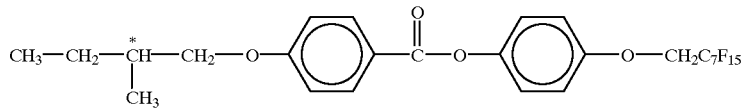
26
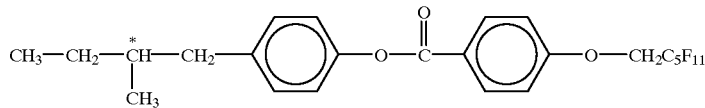
27
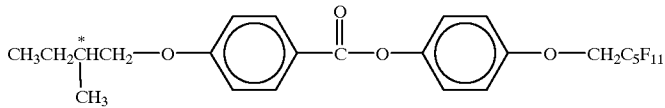
28
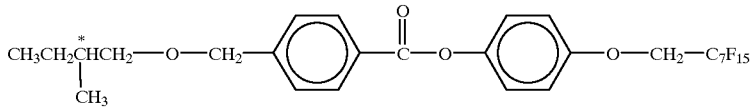
29
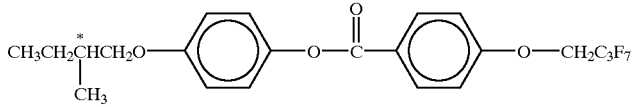
30
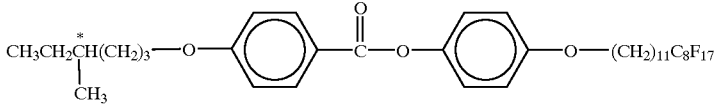
31
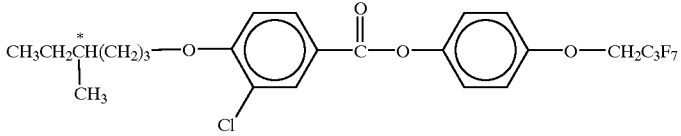
32
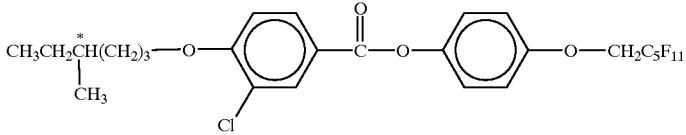
33
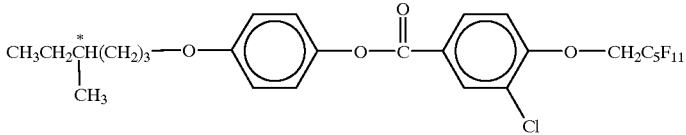
34
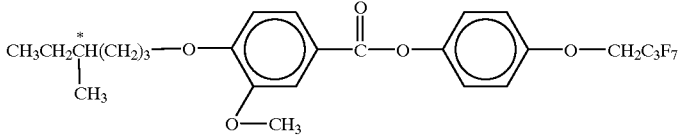

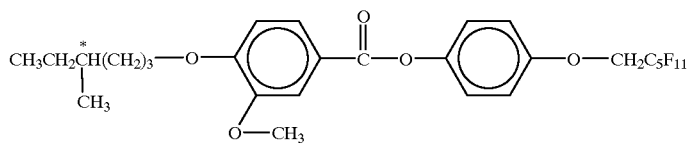
35
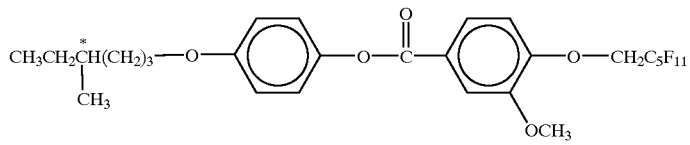
36
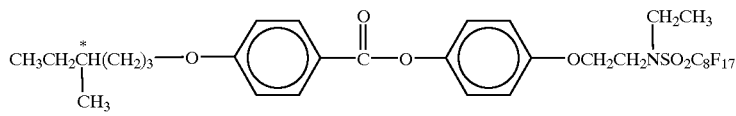
37
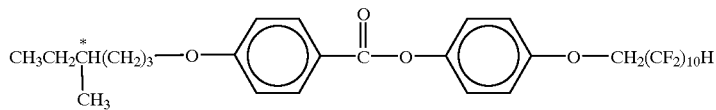
38
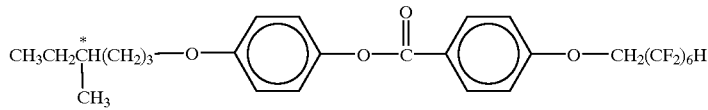
39
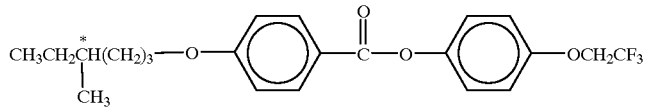
40
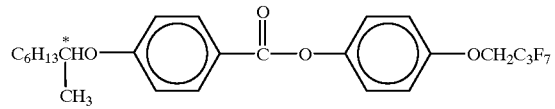
41
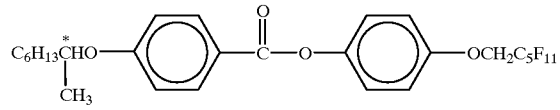
42
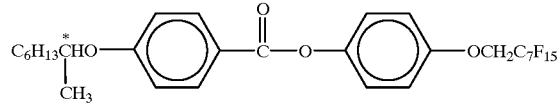
43
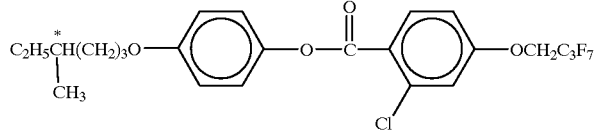
44
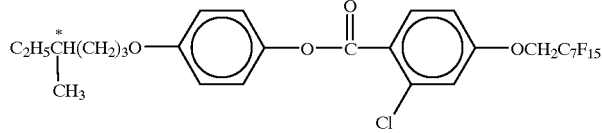
45

46
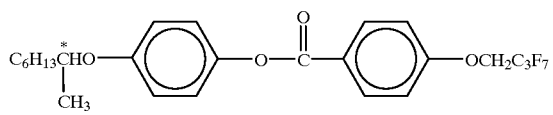
47
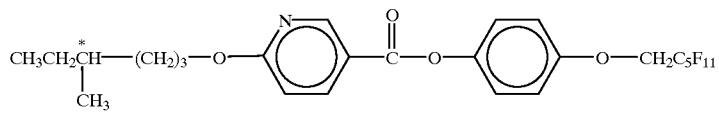
48
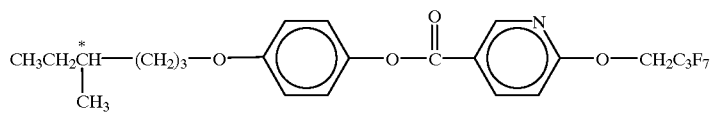
49
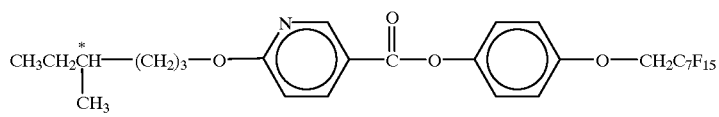
50
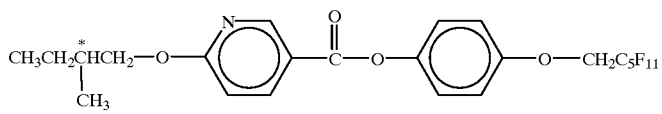
51
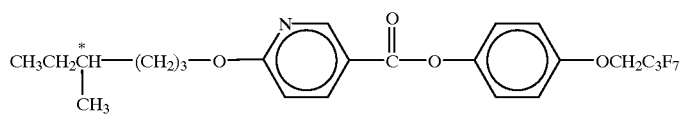
52
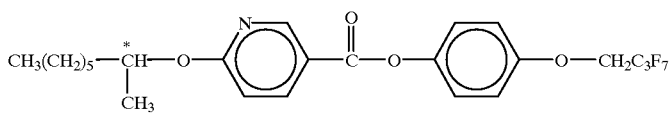
53
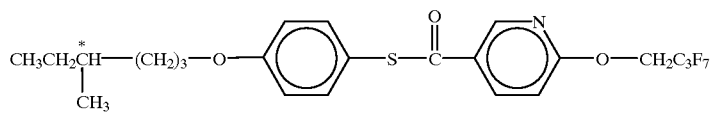
54
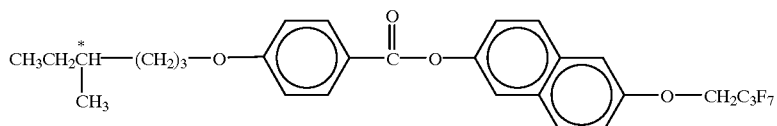
55
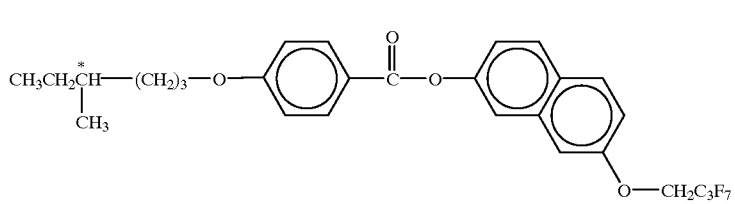
56
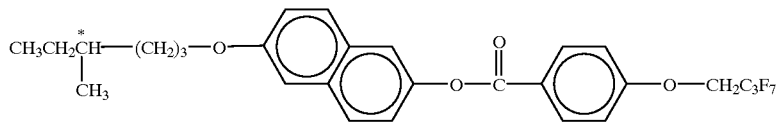

57
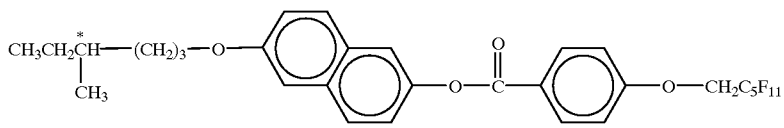
58
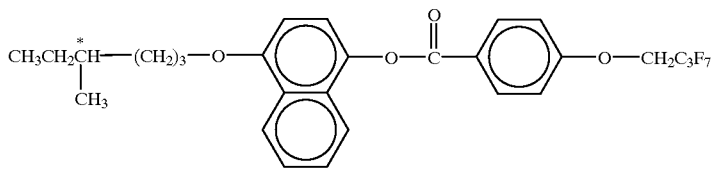
59
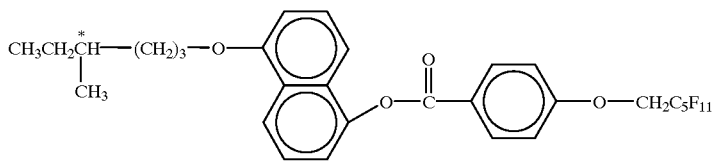
60
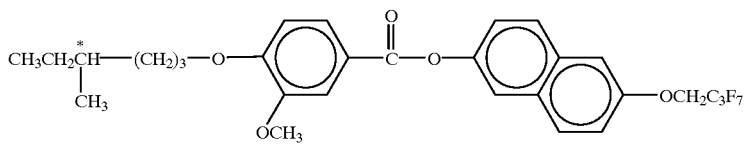
61
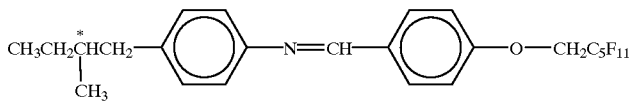
62
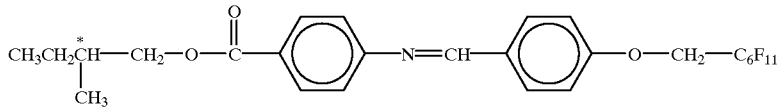
63
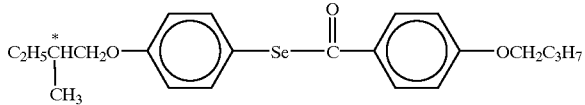
64
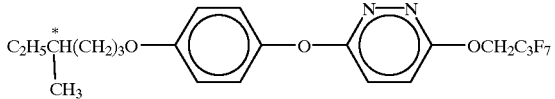
65
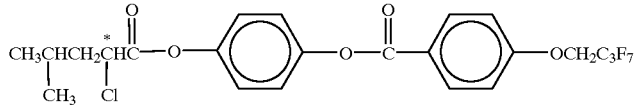
66
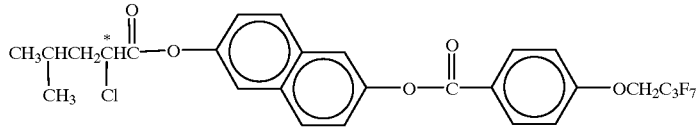
67

-continued

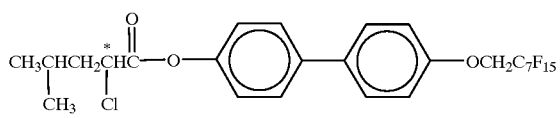

68

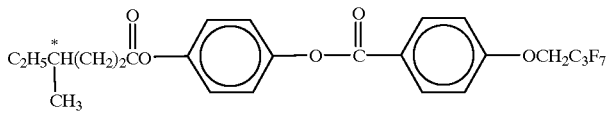

69

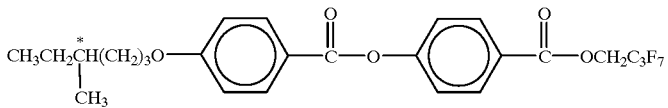

70

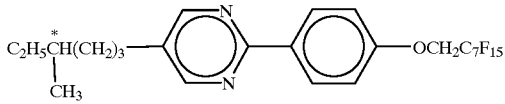

71

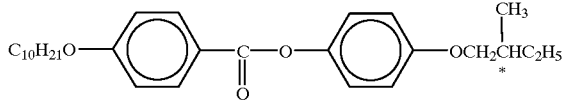

72

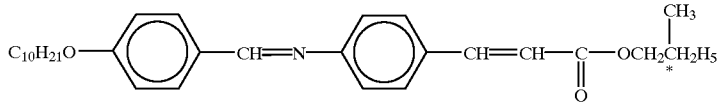

73

These chiral compounds may be used singly or in mixture of two or more species to provide an appropriate chirality to the chiral smectic liquid crystal composition used in the present invention.

More specifically, the liquid crystal composition used in the present invention may include a mesomorphic compound having a fluorocarbon terminal portion as an essentially component and also contain a chiral compound as described in a proportion of 0.5–50 wt. %. In case where the chiral compound has no fluorocarbon terminal portion, the chiral compound may preferably be used in a proportion of 0.1–10 wt. % of the resultant liquid crystal composition in view of mutual solubility with the essential mesomorphic compound having a flurocarbon terminal portion.

The chiral smectic liquid crystal composition used in the present invention can further contain various other mesomorphic compounds appropriately selected from chiral compounds other than those described above and chiral compounds so as to control mutual solubility of the component compounds, and the resultant layer spacing, and further an optional additive, such as an antioxidant, an ultraviolet absorber, a dye or a pigment.

Figure 9:
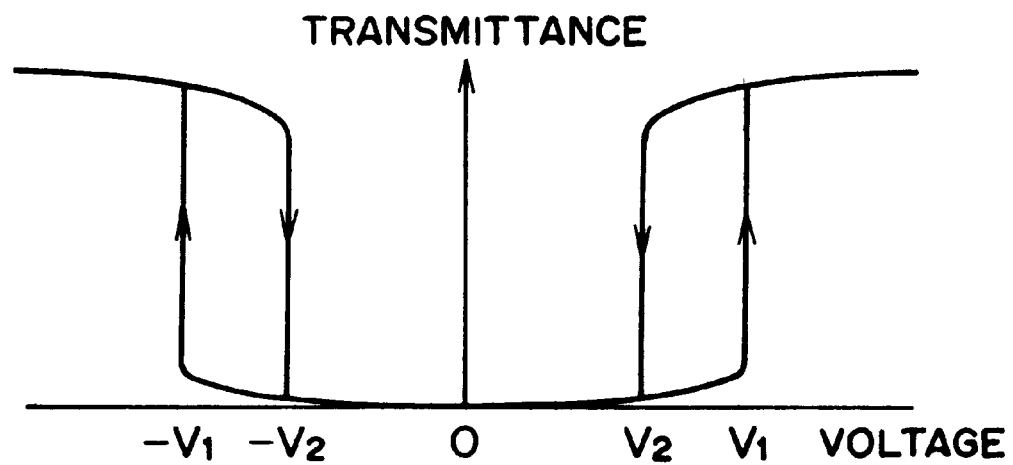
FIG. 9 is a graph showing a double hysteresis characteristic (a voltage-transmittance (V-T) characteristic providing a transmittance curve with two hysteresis loops) as another electro-optical characteristic of a chiral smectic liquid crystal composition used in the liquid crystal device of the present invention.

In the liquid crystal device of the present invention, in order to provide a uniform alignment state, it is possible to employ a chiral smectic liquid crystal composition comprising an antiferroelectric liquid crystal material (composition) showing three stable states and an electro-optical characteristic as shown in FIG. 9 wherein the material provide only one stable state (the darkest state) under no voltage application and a transmittance curve include a hysteresis loop on the positive voltage side and a hysteresis loop on the negative voltage side (herein referred to as "double hysteresis characteristic").

Specifically, the darkest state under no voltage application was changed to a bright state under application of a first voltage of at least $V_1$ (or $-V_1$) (as absolute value) and the bright state was kept under application of a second voltage of at least $V_2$ (or $-V_2$) (as absolute value) (particularly to the first voltage $V_1$ or $-V_1$), thus effecting a halftone display.

Further, as the chiral smectic liquid crystal composition used in the liquid crystal device of the present invention, it is also possible to employ a chiral smectic liquid crystal composition comprising a hydrocarbon-based liquid crystal material providing cholesteric phase and a chevron structure and also showing bistability (i.e., a memory characteristic under no voltage application) in combination with a simple matrix-type electrode structure as shown in FIG. 1, thereby to realize a good alignment state when used in a liquid crystal device driven in an ordinary multiplexing matter.

Figure 8:
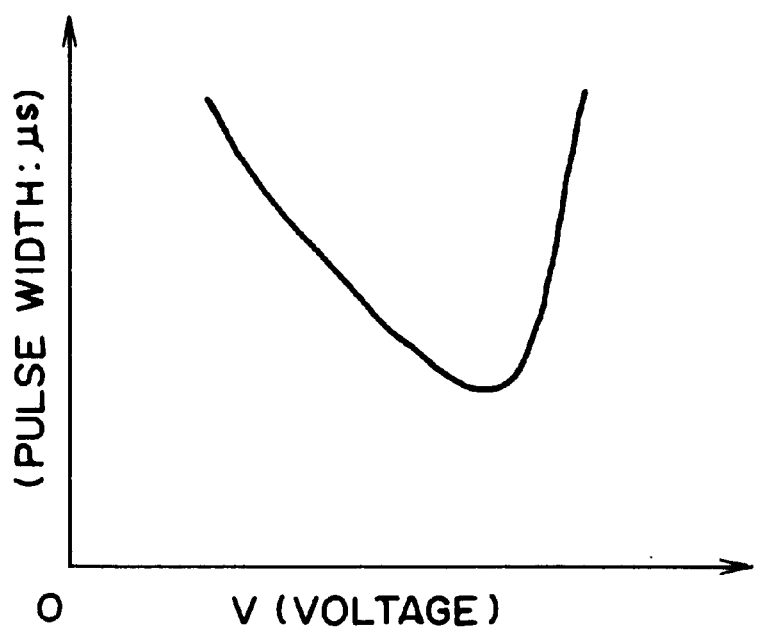
FIG. 8 is ai graph showing a τ-Vmin characteristic (a relationship between a switching pulse width (τ) and an applied (pulse) voltage (V) providing a minimum pulse width under application of a prescribed voltage value (Vmin) as an electro-optical characteristic of a chiral smectic liquid crystal composition used in the liquid crystal device of the present invention.

It is also possible to provide a good alignment state by using a chiral smectic liquid crystal composition showing a negative dielectric anisotropy ($-\Delta\epsilon$) and providing an electro-optical characteristic as shown in FIG. 8 wherein a switching pulse width ($\tau$) is changed depending on an applied (pulse voltage) (V) and provides a minimum pulse width at a prescribed voltage (Vmin) (herein referred to as "$\tau$-Vmin characteristic").

In a display mode using such a $\tau$-Vmin characteristic, it is possible to suppress or minimize a fluctuation of liquid crystal molecules based on a torque caused by the negative dielectric anisotropy at the time of signal voltage application, thus providing a good alignment state leading to a high contrast.

In order to realize a good alignment state, it is also possible to use a chiral smectic liquid crystal composition showing an electro-optical characteristic such that the composition shows no memory characteristic and only one (optically) stable state under no voltage application and an apparent tilt angle (θa) is changed continuously depending on an applied voltage to provide V-shaped linearly changing θa values between +V and −V (V: certain voltage value) (herein referred to as "voltage-dependent V-shaped θa changing characteristic") in combination with, e.g., an active matrix-type driving scheme, thus allowing an analog-like gradation display.

In the case of using the active matrix-type driving scheme in the liquid crystal device of the present invention, one of the pair of substrates is provided with switching elements (for respective pixels), such as thin film transistors (TFTs) or metal-insulator-metals (MIMs).

In the case of using a chiral smectic liquid crystal composition providing the voltage-dependent θa changing characteristic, a tilted state (due to the apparent tilt angle θa) providing a prescribed transmittance is continuously and linearly changed with an increased or decreased applied voltage to provide various display levels suitable for a gradation display.

The liquid crystal device according to the present invention is characterized by the use of the above-mentioned chiral smectic liquid crystal composition to form a liquid crystal layer disposed between a pair of substrates at least one of which is provided with an alignment control layer comprising the above-mentioned polyimide, and other structures thereof are not particularly restricted.

The liquid crystal device according to the present invention can constitute various liquid crystal apparatus inclusive of display apparatus and optical shutter. For example, a liquid crystal apparatus 101 having a control system as illustrated by its block diagram shown in FIG. 4 may be constituted by using a liquid crystal device according to the present invention as a display panel 103.

Figure 4:
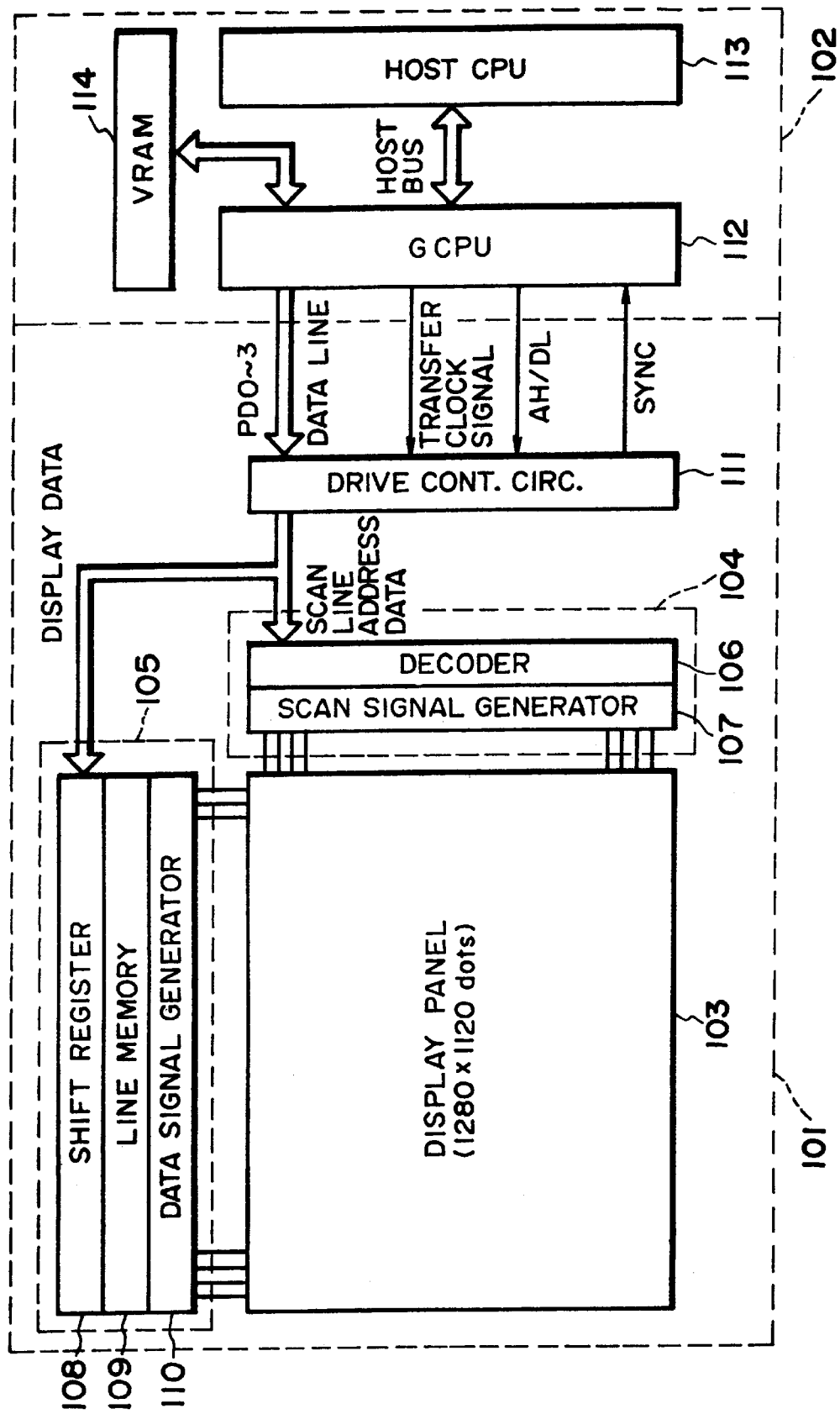
FIG. 4 is a block diagram of a liquid crystal apparatus (display apparatus) including the liquid crystal device using a chiral smectic liquid crystal and a graphic controller.

Referring to FIG. 4, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (video-RAM or VRAM) 114.

Figure 5:
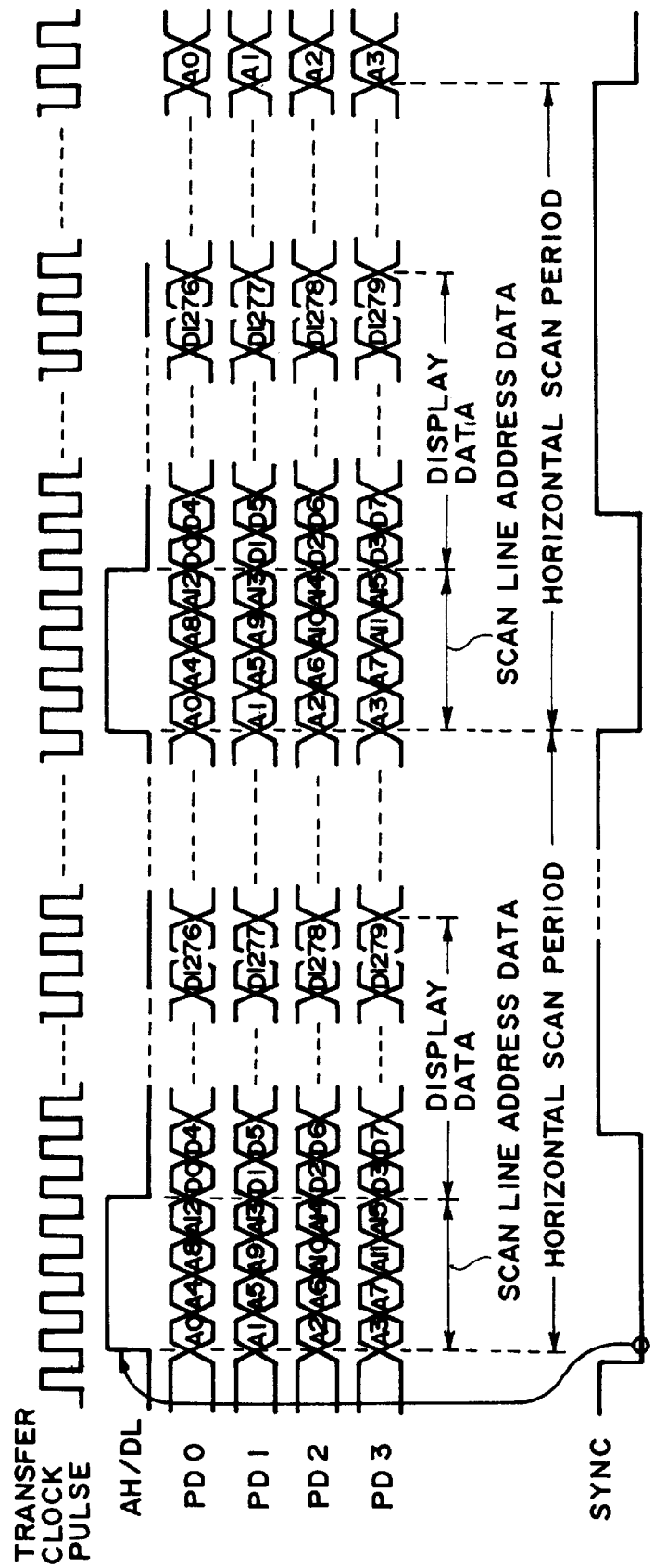
FIG. 5 is a time chart illustrating a manner of image data communication between the display data and the graphic controller.

FIG. 5 is a time chart illustrating a manner of data communication for transferring image data including scanning line address data and certain data format as illustrated by using a communication synchronizing means based on a SYNC signal.

More specifically, image data is generated from a graphic controller 102 in an apparatus main body and is transferred to the display panel 103 by signal transfer means as illustrated in FIGS. 4 and 5. The graphic controller 102 includes graphic central processing unit (GCPU) 112 and image data storage memory (VRAM) 114 as core units and is in charge of control and communication of image data between a host CPU 113 therein and the liquid crystal display apparatus 101. Incidentally, a light source (backlight) may be disposed, as desired, behind the display panel 103.

In case where the liquid crystal device according to the present invention is used to constitute a display device, the chiral liquid crystal composition shows a good responsiveness and can provide a large area of good display image having high resolution, high brightness and excellent contrast.

Hereinbelow, the present invention will be described based on Examples.

EXAMPLE 1

A liquid crystal composition comprising a 95/5 (ratio by weight) mixture of the following compounds A and B was prepared.

<Compound A>

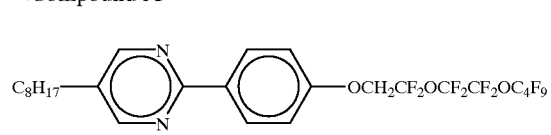

<Compound B>

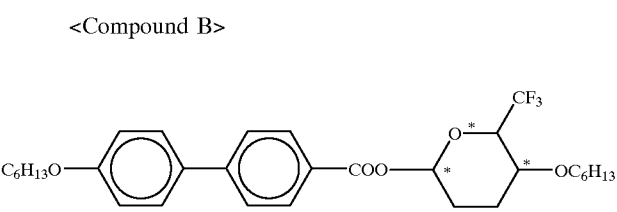

The liquid crystal composition showed the following physical properties.

Phase Transition Series

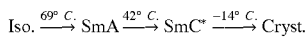

(Iso: isotropic phase, SmA: smectic A phase, SmC*: chiral smectic C phase, Cryst: crystal)

Tilt angle (30° C.): θ=2.58 deg.
Spontaneous polarization: Ps=−22.6 (nC/cm$^2$)
Layer inclination angle (30° C.): δ=0 deg.
$d_{min}/d_A$=3.179 (nm)/3.187 (nm)=0.997

The layer spacing d and the layer inclination angle δ were measured in the following manner.

The methods used were basically similar to the method used by Clark and Lagerwall (Japan display '86, Sep. 30–Oct. 2, 1986, p.p. 456–458) or the method of Ohuchi et al (J.J.A.P., 27 (5) (1988), p.p. 725–728). The measurement was performed by using a diffraction apparatus (available from MAC Science having a rotary cathode-type X-ray generating unit), and 80 μm-thick glass sheets ("Microsheets", available from Corning Glass Works) were used as substrates so as to minimize the heat capacity and the X-ray absorption with the glass substrates.

More specifically, for measurement of the layer spacing d, a sample liquid crystal composition was applied in a 5 mm-square size so as to form a flat surface on the 80 μm-thick glass sheet and, while being temperature-controlled by a temperature-controlling plate and a temperature monitoring thermocouple, irradiated with X rays from a rotary X-ray source, so that the output light including diffraction rays was detected by a detector (counter), similarly as in the ordinary powder X-ray diffraction. An angle providing a peak of X-ray intensity was substituted in the Bragg's formula for diffraction condition to obtain a layer spacing d.

Each sample liquid crystal composition was first brought to its isotropic phase temperature, and the measurement was repeated every 3° C. or every 1° C. in the vicinity of a transition point while cooling the sample down to a temperature where no diffraction peak was observed, in order to improve a smoothness of a diffraction plane. The automatic temperature controller used allowed a control accuracy of ±0.3° C. at each measurement temperature.

The measurement was performed by using CuKα-rays (1.54050 Å) at a power of 45 kV-100 mA as analyzing rays and using a slit system including DS of 0.05 mm, SS of 0.05 mm and RS of 0.05 mm. The scanning was performed at a rate of 3 deg./min.

For the measurement of smectic layer inclination angle δ, a sample cell having a cell gap of 80 μm was prepared by using a pair of the 80 μm-thick glass sheets while using the same glass sheet as a spacer. A sample liquid crystal composition filling the sample cell was heated to isotropic phase and then gradually cooled to be homogeneously aligned under application of a magnetic field in a direction parallel to the substrates by an electromagnet. Then, the X-ray detector was set at the angle 2θ giving the above-mentioned layer spacing d, and the sample cell was subjected to θ-scanning. From the measured values, δ was calculated according to the method described in the above-mentioned references.

According to the above-described method, it is possible to obtain a layer inclination angle δ intrinsic to a sample liquid crystal composition while substantially removing the effect of a cell thickness thereon. However, it is also possible to obtain a substantially identical δ value in the temperature range of ca. 20° C. to 60° C. by using a 1.2 μm-thick cell having rubbed alignment films of polyimides (like those obtained from a commercially available polyimide precursor, such as "LP-64", "SP-710" or "SP-510" (available from Toray K.K.) instead of such an 80 μm-thick cell subjected to a magnetic field aligning treatment.

Figure 7:
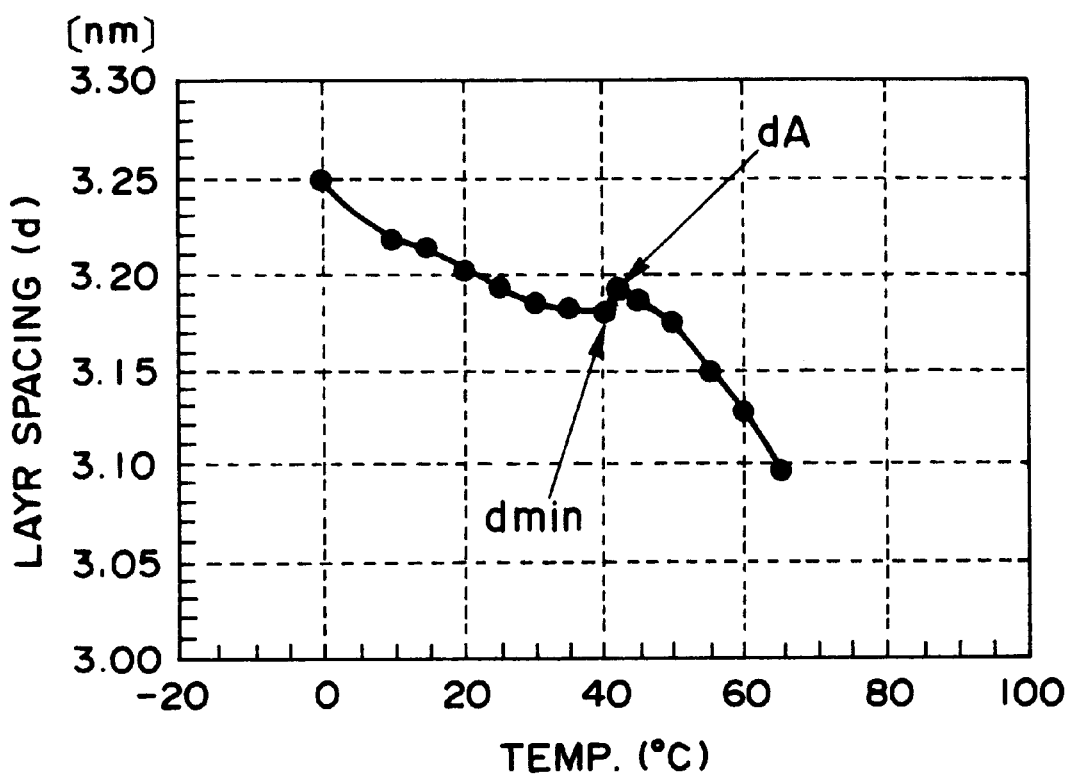
FIG. 7 is a graph showing a temperature dependence of layer spacing (d) of a chiral smectic liquid crystal composition used in Examples appearing hereinafter.

FIG. 7 is a graph showing a temperature-dependence of layer spacing of the above-mentioned A/B mixture composition. In FIG. 7, $d_A$ represents a layer spacing at a first transition point (ca. 42° C.) and $d_{min}$ represents a layer spacing at a second transition point (ca. 40° C.)

In this example, a liquid crystal cell (device) was prepared in the following manner.

Two 1.1 mm-thick glass substrates each provided with a ca. 150 nm-thick ITO film (transparent electrode) were provided, and further coated with alignment control films by spin coating under different conditions.

More specifically, one substrate (first substrate) was coated with a solution in an N-methylpyrrolidone/n-butyl cellosolve (=8/2) mixture solvent containing 0.8 wt. % (as solid) of a polyamic acid as a precursor to a polyimide represented by a recurring unit of the following formula, followed by pre-drying at 80° C. for 5 min. and hot baking at 200° C. for 1 hour, to form a 5 nm-thick alignment film, which was then rubbed with a nylon cloth as a uniaxial aligning treatment.

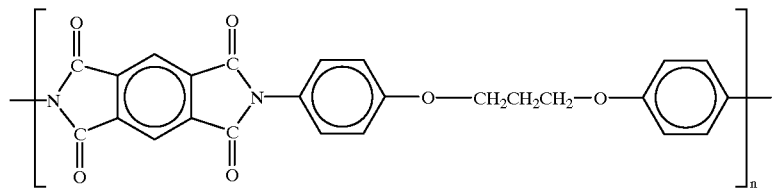

The other substrate was coated with 0.5 wt. %-solution in ethanol of a silane coupling agent ("ODS-E", mfd. by Chisso K.K.) by spin coating at 2000 rpm for 20 sec., followed by pre-drying at 80° C. for 5 min and hot-drying at 180° C. for 1 hour.

Then, spacer silica beads of 2.0 μm in average diameter were dispersed on the first substrate and the other substrate was superposed thereon to form a blank cell, which was then filled with the above-mentioned chiral smectic liquid crystal composition under vacuum in its isotropic liquid state, followed by cooling at a rate of 1° C./min. to room temperature to produce a liquid crystal device.

The thus-prepared liquid crystal device exhibited a high contrast of 95 as mentioned according to the following method (as a method for evaluating the alignment characteristic).

First, a sample liquid crystal device was sandwiched between a pair of polarizers disposed in right-angle cross nicols and supplied with driving waveforms as shown in FIG. 6A (enlarged in FIGS. 6AA and 6AB) (20 V, ⅓ bias, duty factor of ¹⁄₁₀₀₀). Pulse widths were adjusted to cause bistable switching. At a first switched state, the liquid crystal device was rotated so as to find the darkest position where the transmitted light intensity Ib (as shown in FIG. 6B) was measured by a photomultiplier. Then, after switching into a second state, the light intensity Iw at the brightest state (as shown in FIG. 6B) was measured. From the results, a contrast ratio (CR) as an evaluation factor was obtained as a ratio Iw/Ib.

The value CR is a measure of an alignment uniformity and is decreased also in the case of alignment defects causing light leakage therethrough to provide a larger Ib value, thus reducing the CR value. Further, if a liquid crystal material shows a chevron structure, not a bookshelf structure, an apparent tilt angle θa is decreased, thus leading to a lower CR value.

EXAMPLES 2–10

Each of liquid crystal devices was prepared by injecting the above-mentioned liquid crystal composition into a cell which was prepared in the same manner as in Example 1 except for forming an alignment control film of a polyimide having a corresponding recurring unit shown in Table 1 below by hot baking on the first substrate. The respective liquid crystal devices were subjected to measurement of the contrast ratio (CR) in the same manner as in Example 1.

The results are shown in Table 1 below.

TABLE 1

Structure of polyimide

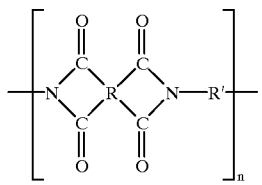

| Ex. No. | R | R' | CR value |
|---|---|---|---|
| 2 | tetramethylbenzene | —C₆H₄—O—CH₂CH₂CH₂CH₂—O—C₆H₄— | 92 |
| 3 | dimethylnaphthalene | —C₆H₄—O—CH₂CH₂—O—C₆H₄— | 90 |
| 4 | cyclobutane | —C₆H₄—O—CH₂CH₂CH₂CH₂CH₂—O—C₆H₄— | 87 |
| 5 | tetramethylbenzene | —C₆H₄—O—CH₂—C(CH₃)₂—CH₂—O—C₆H₄— | 90 |
| 6 | tetramethylbenzene | —C₆H₄—CH₂CH₂—C₆H₄— | 88 |
| 7 | tetramethylbenzene | —C₆H₄—CH₂CH₂CH₂—C₆H₄— | 86 |
| 8 | dimethylnaphthalene | —C₆H₄—CH₂CH₂CH₂CH₂—C₆H₄— | 90 |
| 9 | cyclobutane | —C₆H₄—CH₂CH₂—C₆H₄— | 85 |
| 10 | tetramethylbenzene | —C₆H₄—CH₂—C(CH₃)₂—CH₂—C₆H₄— | 83 |

EXAMPLE 11

A liquid crystal device was prepared and evaluated by injecting the above-mentioned liquid crystal composition into a cell which was prepared in the same manner as in Example 1 except for forming an alignment control film of a silicon-type oligomer ("Glass Resin GR650" (trade name), mfd. by Techneglas Inc.) applied in a 0.4 wt. %-solution in butanol on the second substrate. The device showed a contrast of 98.

REFERENCE EXAMPLES 1–6

Each of liquid crystal devices was prepared and evaluated by injecting the above-mentioned liquid crystal composition into a cell which was prepared in the same manner as in Example 1 except for forming an alignment control film of a polyimide having a corresponding recurring unit shown in Table 2 below by hot baking on the first substrate.

The results are shown in Table 2.

TABLE 2

Structure of reference polyimide

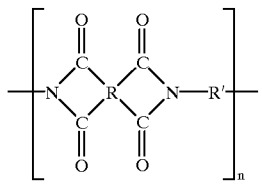

| Ref. Ex. No. | R | R' | CR value |
|---|---|---|---|
| 1 | tetramethylbenzene | –C6H4–O–C6H4–C6H4–O–C6H4– | 12 |
| 2 | trimethylbenzene | –C6H4–O–C6H4–C(CH3)2–C6H4–O–C6H4– | 25 |
| 3 | dimethylnaphthalene | –C6H4–O–C6H4–C(CF3)2–C6H4–O–C6H4– | 20 |
| 4 | dimethylbenzophenone | –C6H4–O–CH2CH2CH2–O–C6H4– | 14 |
| 5 | trimethylbenzene | –C6H4–CH2–C6H4– | 30 |
| 6 | bis(dimethylphenyl)hexafluoropropane | –C6H4–CH2CH2–C6H4– | 18 |

REFERENCE EXAMPLE 7

A liquid crystal device was prepared and evaluated in the same manner as in Example 1 except for forming the same rubbed polyimide alignment control film formed on the first substrate also on the second substrate and the substrates were superposed so that their rubbed directions were parallel and identical to each other. The device showed a contrast ratio of 44.

REFERENCE EXAMPLE 8

A liquid crystal device was prepared and evaluated in the same manner as in Example 1 except for replacing the liquid crystal composition with a chiral smectic liquid crystal composition ("CS-1014" (trade name), mfd. by Chisso K.K.) showing physical properties shown below. The device showed a contrast ratio of 9.

Phase Transition Series

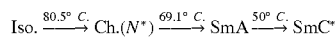

(Ch.: cholesteric phase, N*: chiral nematic phase)

$d_{min}/d_A = 0.946$

As is understood from the results of the above-described Examples 1–11 and Reference Examples 1–8, it has become possible to provide a liquid crystal device including a uniform and good alignment state of a chiral smectic liquid crystal composition satisfying a relationship of $d_{min}/d_A \geq 0.990$ which may lack Ch phase and typically contain a compound comprising a fluorocarbon terminal portion and a hydrocarbon terminal portion connected with a central core and having smectic phase or latent smectic phase by using an alignment control film comprising a polyimide having a recurring unit represented by the general formula (I) formed on one of the substrate.

EXAMPLES 12–20

Each of blank cells was prepared in the same manner as in Example 1 except that (i) the polyimide alignment control film (used in Example 1) formed on the first substrate was changed to a 10 nm-thick polyimide alignment control film shown in Table 3 shown below, (ii) the silane coupling agent film formed on the second substrate was also changed to the corresponding polyimide alignment control film shown in Table 3 shown below, and (iii) the first and second substrates were superposed so that their rubbed directions were parallel and identical to each other via spacer silica beads of 1.2 μm in average diameter.

The thus prepared each blank cell was filled with a ferroelectric liquid crystal material ("FELIX-016/030", mfd. by Hoechst Co.) showing a τ-Vmin characteristic as described above and the following physical properties.

Phase Transition Series

$Ps (25° C.) = 4.3 \text{ nC/cm}^2$ dielectric anisotropy = $\Delta\epsilon = -2$ The thus prepared liquid crystal devices were subjected to measurement of a contrast ratio (CR) in the same manner as in Example 1.

The results are shown in Table 3.

TABLE 3

Structure of polyimide

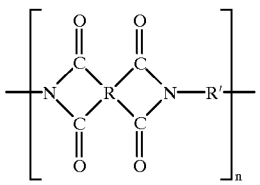

| Ex. No. | R | R' | CR value |
|---|---|---|---|
| 12 | ⬡ (tetramethyl benzene) | —⬡—O—CH₂CH₂CH₂CH₂—O—⬡— | 75 |
| 13 | ⬡⬡ (tetramethyl naphthalene) | —⬡—O—CH₂CH₂—O—⬡— | 81 |
| 14 | ▱ (cyclobutane) | —⬡—O—CH₂CH₂CH₂CH₂CH₂—O—⬡— | 77 |
| 15 | ⬡ (tetramethyl benzene) | —⬡—O—CH₂—C(CH₃)₂—CH₂—O—⬡— | 70 |

TABLE 3-continued

Structure of polyimide

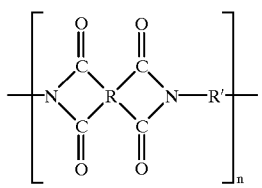

| Ex. No. | R | R' | CR value |
|---|---|---|---|
| 16 | (dimethylphenyl)-C(CF$_3$)$_2$-(methylphenyl) | -C$_6$H$_4$-CH$_2$CH$_2$-C$_6$H$_4$- | 83 |
| 17 | tetramethylphenyl | -C$_6$H$_4$-CH$_2$CH$_2$CH$_2$-C$_6$H$_4$- | 71 |
| 18 | dimethylnaphthyl | -C$_6$H$_4$-CH$_2$CH$_2$CH$_2$CH$_2$-C$_6$H$_4$- | 84 |
| 19 | cyclobutyl | -C$_6$H$_4$-CH$_2$CH$_2$-C$_6$H$_4$- | 87 |
| 20 | tetramethylphenyl | -C$_6$H$_4$-CH$_2$-C(CH$_3$)$_2$-CH$_2$-C$_6$H$_4$- | 78 |

REFERENCE EXAMPLES 9–14

Each of liquid crystal devices was prepared and evaluated by injecting the above-mentioned liquid crystal composition into a cell which was prepared in the same manner as in Example 12 except for using an alignment control film of a polyimide having a corresponding recurring unit shown in Table 4 below on the first and second substrates, respectively. The thus prepared liquid crystal devices were subjected to measurement of a contrast ratio (CR) in the same manner as in Example 1.

The results are shown in Table 4.

TABLE 4

Structure of reference polyimide

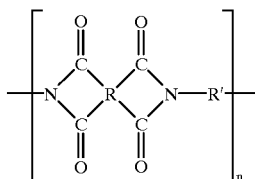

| Ref. Ex. No. | R | R' | CR value |
|---|---|---|---|
| 9 | | | 14 |
| 10 | | | 17 |
| 11 | | | 21 |
| 12 | | | 18 |
| 13 | | | 25 |
| 14 | | | 19 |

As is apparent from the results of the above-described Examples 12–20 and Reference Examples 9–14, in a liquid crystal device using a ferroelectric liquid crystal material (composition) showing a negative dielectric anisotropy and a τ-Vmin characteristic, it has become possible to provide a uniform and good alignment state leading to a higher contrast ratio.

EXAMPLES 21–29

Each of blank cells was prepared in the same manner as in Example 1 except that the polyimide alignment control film (used in Example 1) formed on the first substrate was changed to a corresponding polyimide alignment control film shown in Table 5 shown below.

The thus prepared each blank cell was filled with a ferroelectric liquid crystal material ("CS-4000", mfd. by Chisso K.K.) showing a "double hysteresis characteristic" as described above and the following physical properties.

Phase Transition Series $$\text{Cryst.} \xrightarrow{-10.1° C.} \text{SmC}^*_{SA} \xrightarrow{81.6° C.} \text{SmC}^* \xrightarrow{83° C.} \text{SmA} \xrightarrow{100.8° C.} \text{Iso.}$$

($SmC_A$: chiral smectic $C_A$ (antiferroelectric) phase)
Ps (25° C.)=80 nC/cm$^2$ The thus prepared liquid crystal devices were subjected to measurement of a darkest transmittance (Td) in following manner.

First, when a sample liquid crystal device was not sandwiched between a pair of polarizers disposed in right-angle cross nicols, a transmittance (transmitted light intensity) ($I_0$) was measured by using a polarizing microscope equipped with photomultiplier. Then, the sample liquid crystal device was sandwiched between such a pair of cross nicol polarizers to measure a transmittance (Id) at the darkest position. Thereafter, the sample liquid crystal device was removed and the polarizers were disposed in parallel nicols, followed by measurement of a transmittance ($I_{100}$).

The darkest transmittance (Td) was determined according to the following equation:

$$Td\ (\%) = [(Id - I_0)/(I_{100} - I_0)] \times 100.$$

The smaller transmittance (Td) means a higher level of the darkest state, thus resulting in a uniform alignment.

Generally, a transmittance value (Td) below 0.1% provides a resultant liquid crystal device with a considerably high darkest level. On the other hand, if the transmittance value (Td) is at least 1.0%, the resultant liquid crystal device was of practically unacceptable (darkest) level.

The results are shown in Table 5.

TABLE 5

Structure of polyimide

| Ex. No. | R | R' | Td (%) |
|---|---|---|---|
| 21 | (tetramethylbenzene) | —⟨⟩—O—(CH₂)₃—O—⟨⟩— | 0.03 |
| 22 | (tetramethylnaphthalene) | —⟨⟩—O—(CH₂)₃—O—⟨⟩— | 0.02 |
| 23 | (dimethylcyclobutane) | —⟨⟩—O—(CH₂)₄—O—⟨⟩— | 0.05 |
| 24 | (tetramethylbenzene) | —⟨⟩—O—CH₂—C(CH₃)₂—CH₂—O—⟨⟩— | 0.09 |
| 25 | (tetramethylbenzene) | —⟨⟩—(CH₂)₃—⟨⟩— | 0.08 |
| 26 | (tetramethylbenzene) | —⟨⟩—(CH₂)₅—⟨⟩— | 0.05 |
| 27 | (tetramethylnaphthalene) | —⟨⟩—(CH₂)₃—⟨⟩— | 0.06 |

TABLE 5-continued

Structure of polyimide

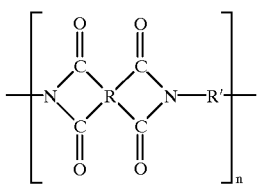

| Ex. No. | R | R' | Td (%) |
|---|---|---|---|
| 28 | (cyclobutane) | —⌬—(CH$_2$)$_4$—⌬— | 0.06 |
| 29 | (tetramethylbenzene) | —⌬—CH$_2$—C(CH$_3$)$_2$—CH$_2$—⌬— | 0.07 |

EXAMPLE 30

A liquid crystal device was prepared and evaluated in the same manner as in Example 23 except for forming the same rubbed polyimide alignment control film formed on the first substrate (in Example 23) also on the second substrate and the substrates were superposed so that their rubbed directions were parallel and identical to each other. The device showed a transmittance Td of 0.07%.

REFERENCE EXAMPLES 15–20

Each of liquid crystal devices were prepared and evaluated in the same manner as in Example 21 except for forming an alignment control film of a polyimide having a corresponding recurring unit shown in Table 6 below by hot baking on the first substrate.

The results are shown in Table 6.

TABLE 6

Structure of reference polyimide

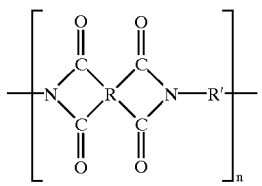

| Ref. Ex. No. | R | R' | Td (%) |
|---|---|---|---|
| 15 | (tetramethylbenzene) | —⌬—O—⌬—⌬—O—⌬— | 1.08 |
| 16 | (tetramethylbenzene) | —⌬—O—⌬—C(CH$_3$)$_2$—⌬—O—⌬— | 1.21 |

TABLE 6-continued

Structure of reference polyimide

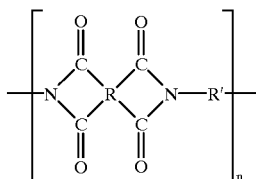

| Ref. Ex. No. | R | R' | Td (%) |
|---|---|---|---|
| 17 | 2,3-dimethylnaphthalene structure | -C6H4-O-C6H4-C(CF3)2-C6H4-O-C6H4- | 1.51 |
| 18 | bis(3,4-dimethylphenyl) ketone structure | -C6H4-O-CH2CH2CH2-O-C6H4- | 1.15 |
| 19 | 3,4,5-trimethylphenyl structure | -C6H4-CH2-C6H4- | 1.05 |
| 20 | bis(3,4-dimethylphenyl)-C(CF3)2- structure | -C6H4-CH2CH2-C6H4- | 1.43 |

REFERENCE EXAMPLE 21

A liquid crystal device was prepared and evaluated in the same manner as in Example 21 except for forming the same rubbed polyimide alignment control film formed on the first substrate used in Reference Example 18 also on the second substrate and the substrates were superposed so that their rubbed directions were parallel and identical to each other. As a result of measurement of a transmittance Td (%) similarly as in Example 21, the device showed a transmittance (Td) of 1.21%.

EXAMPLES 31–39

Each of blank cells was prepared in the same manner as in Example 1 except that the polyimide alignment control film (used in Example 1) formed on the first substrate was changed to a corresponding polyimide alignment control film shown in Table 7 shown below.

The thus prepared each blank cell was filled with a ferroelectric liquid crystal composition prepared by mixing the following compounds in the indicated proportions and showing the physical properties shown below.

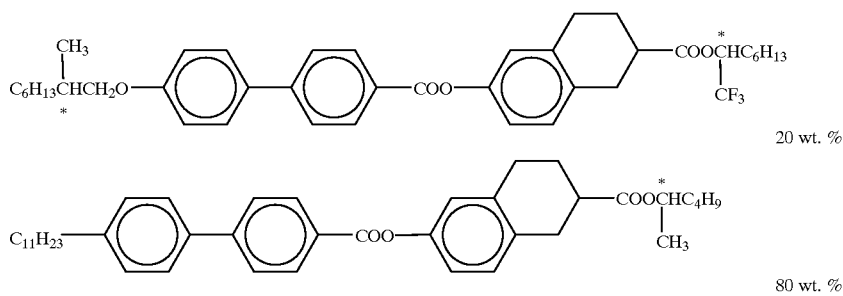

20 wt. %

80 wt. %

Phase Transition Series

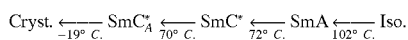

Ps (25° C.)=148 nC/cm$^2$

The chiral smectic (antiferroelectric) liquid crystal composition used in these examples showed an electrooptical characteristic such that liquid crystal molecules showed only one optically stable state under no voltage application and an apparent tilt angle θa was continuously and linearly changed depending on an applied voltage between a certain positive voltage and a certain negative voltage within the liquid crystal devices ("voltage-dependent V-shaped θa changing characteristic" as described hereinabove).

The thus prepared liquid crystal devices were subjected to measurement of a darkest transmittance (Td) in same manner as in Example 21.

The results are shown in Table 7.

TABLE 7

Structure of polyimide

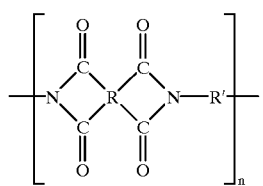

| Ex. No. | R | R' | Td (%) |
|---|---|---|---|
| 31 | (tetramethylphenyl) | —⌬—O—(CH$_2$)$_5$—O—⌬— | 0.04 |
| 32 | (tetramethylnaphthyl) | —⌬—O—(CH$_2$)$_2$—O—⌬— | 0.03 |
| 33 | (dimethylcyclobutyl) | —⌬—O—(CH$_2$)$_5$—O—⌬— | 0.02 |
| 34 | (tetramethylphenyl) | —⌬—O—CH$_2$—C(CH$_3$)$_2$—CH$_2$—O—⌬— | 0.09 |
| 35 | (tetramethylphenyl) | —⌬—(CH$_2$)$_4$—⌬— | 0.05 |
| 36 | (tetramethylphenyl) | —⌬—(CH$_2$)$_8$—⌬— | 0.09 |
| 37 | (tetramethylnaphthyl) | —⌬—(CH$_2$)$_4$—⌬— | 0.03 |
| 38 | (dimethylcyclobutyl) | —⌬—(CH$_2$)$_3$—⌬— | 0.01 |

TABLE 7-continued

Structure of polyimide

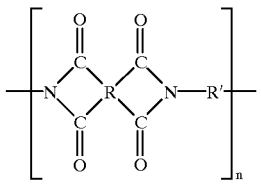

| Ex. No. | R | R' | Td (%) |
|---|---|---|---|
| 39 | ![tetramethylbenzene] | -C6H4-CH2-C(CH3)2-CH2-C6H4- | 0.10 |

EXAMPLE 40

A liquid crystal device was prepared and evaluated in the same manner as in Example 35 except for forming the same rubbed polyimide alignment control film formed on the first substrate (in Example 35) also on the second substrate and the substrates were superposed so that their rubbed directions were parallel and identical to each other. The device showed a transmittance Td of 0.05%.

REFERENCE EXAMPLES 22–27

Each of liquid crystal devices was prepared and evaluated in the same manner as in Example 31 except for forming an alignment control film of a polyimide having a corresponding recurring unit shown in Table 8 below by hot baking on the first substrate.

The results are shown in Table 8.

TABLE 8

Structure of reference polyimide

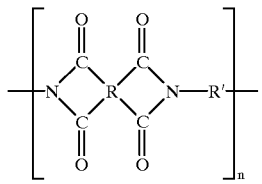

| Ref. Ex. No. | R | R' | Td (%) |
|---|---|---|---|
| 22 | ![tetramethylbenzene] | -C6H4-O-C6H4-C6H4-O-C6H4- | 1.01 |
| 23 | ![tetramethylbenzene] | -C6H4-O-C6H4-C(CH3)2-C6H4-O-C6H4- | 1.32 |
| 24 | ![dimethylnaphthalene] | -C6H4-O-C6H4-C(CF3)2-C6H4-O-C6H4- | 1.25 |

TABLE 8-continued

Structure of reference polyimide

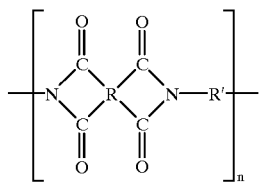

| Ref. Ex. No. | R | R' | Td (%) |
|---|---|---|---|
| 25 | 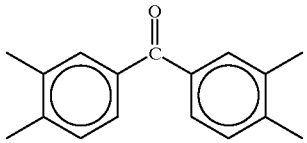 | 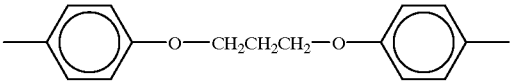 —O—CH₂CH₂CH₂—O— | 1.14 |
| 26 | 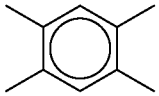 | 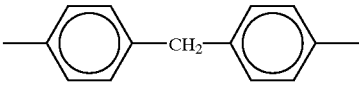 —CH₂— | 1.42 |
| 27 | 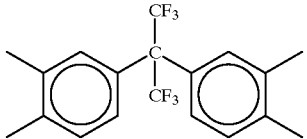 | 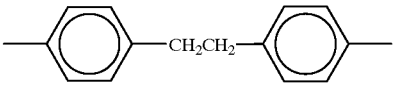 —CH₂CH₂— | 1.38 |

REFERENCE EXAMPLE 28

A liquid crystal device was prepared and evaluated in the same manner as in Example 31 except for forming the same rubbed polyimide alignment control film formed on the first substrate used in Reference Example 24 also on the second substrate and the substrates were superposed so that their rubbed directions were parallel and identical to each other. As a result of measurement of a transmittance Td (%) similarly as in Example 21, the device showed a transmittance (Td) of 1.25%.

As is understood from the results of the above-described examples (Examples 21–30, Reference Examples 15–21, Examples 31–40 and Reference Examples 22–28), in a liquid crystal device employing a combination of a chiral smectic (particularly antiferroelectric) liquid crystal composition providing a double hysteresis characteristic characteristic or a voltage-dependent θ a changing characteristic with a polyimide alignment control film of the formula (I) (particularly provided to one of the pair of substrates), it has become possible to realize a uniform and good alignment state resulting in an improved (darkest) transmittance (Td), thus allowing control of an analog-like gradation display with improved display qualities.

What is claimed is:

1. A liquid crystal device, comprising:
    a pair substrates each provided with an electrode, and a chiral smectic liquid crystal composition disposed between the substrates,
    wherein at least one of the substrates is provided with an alignment control film of a polyimide represented by the following formula (I):

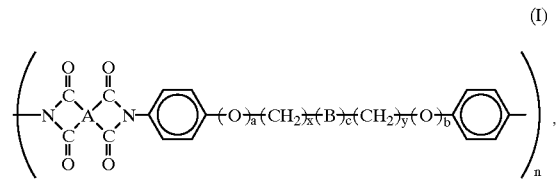

in which A denotes

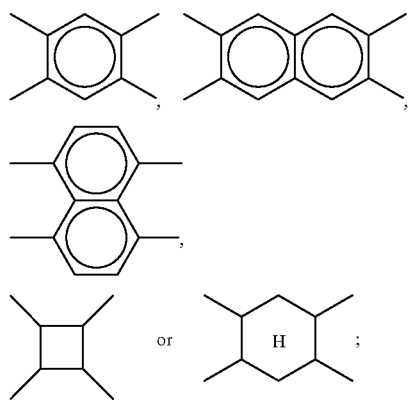

B denotes a divalent group represented by —CR₁ (R₂)— where $R_1$ and $R_2$ independently denote H or alkyl group;

a, b and c are independently 0 or 1;
x and y are independently an integer of at least 0 and x+y=at least 2; and
n is an integer of at least 2.

2. A liquid crystal device according to claim 1, wherein a and b in the formula (I) are 1.

3. A liquid crystal device according to claim 1, wherein a, b and c in the formula (I) are 0.

4. A liquid crystal device according to claim 1, wherein said chiral smectic liquid crystal composition shows no cholesteric phase and has a layer spacing-changing characteristic providing a layer spacing $d_A$ at a first transition point where the layer spacing of the liquid crystal composition begins to decrease at a discontinuously larger decrease rate on temperature decrease in vicinity of a transition temperature from smectic A phase to chiral smectic C phase and a layer spacing $d_{min}$ at a second transition point where the layer spacing of the liquid crystal composition begins to increase on further temperature decrease from the first transition point, wherein $0.990 \leq d_{min}/d_A$.

5. A liquid crystal device according to claim 4, wherein the pair of substrates are provided with first and second alignment control films, respectively, said first alignment control film provided to one substrate comprising a polyimide represented by the formula (I) and which has been subjected to a uniaxial aligning treatment, and said second alignment control film provided to the other substrate which has not been subjected to a uniaxial aligning treatment.

6. A liquid crystal device according to claim 1, wherein said chiral smectic liquid crystal composition comprises at least one species of fluorine-containing mesomorphic compound comprising a fluorocarbon terminal portion and a hydrocarbon terminal portion connected with a central core and having a smectic phase or a latent smectic phase.

7. A liquid crystal device according to claim 6, wherein said fluorocarbon terminal portion of the fluorine-containing mesomorphic compound is a group represented by the formula —$D^1$—$F_{xa}G_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20; and pa is 0–4.

8. A liquid crystal device according to claim 6, wherein said fluorocarbon terminal portion of the fluorine-containing mesomorphic compound is a group represented by the formula —$D^2$—$(C_{xb}F_{2xb}$—O$)_{za}$—$C_{ya}F_{2ya+1}$, where xb is 1–10 independently for each ($C_{xb}F_{2xb}$—O); ya is 1–10; za is 1–10; —$D^2$— is —CO—O—$C_{rc}H_{2rc}$, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$—, —$C_{rc}H_{2rc}$—N($C_{pb}H_{2pb+1}$)—CO—, or a covalent bond, where rc and rd are independently 1–20; sa is independently 1–10 for each ($C_{sa}H_{2sa}$—O); ta is 1–6; and pb is 0–4.

9. A liquid crystal device according to claim 6, wherein said fluorine-containing mesomorphic compound is represented by the general formula (II):

Formula (II):

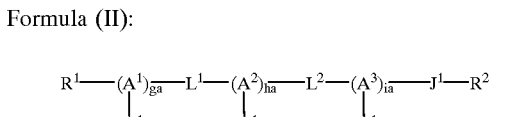

where $A^1$, $A^2$ and $A^3$ are each independently

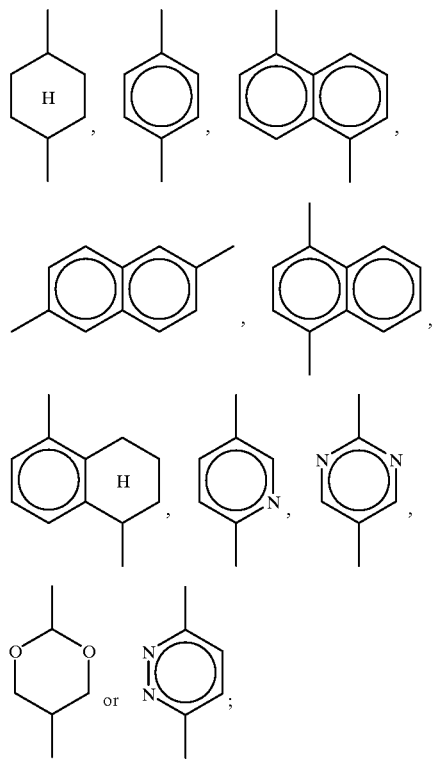

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

10. A liquid crystal device according to claim 6, wherein said fluorine-containing mesomorphic compound is represented by the general formula (III):

Formula (III):

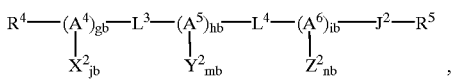

wherein $A^4$, $A^5$ and $A^6$ are each independently

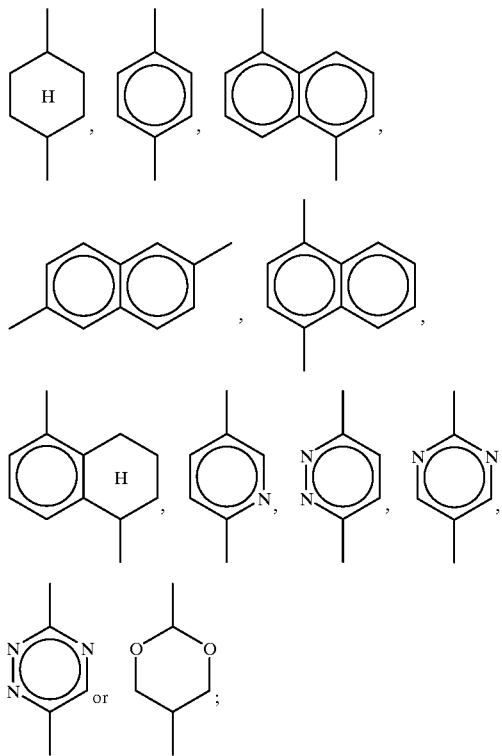

gb, hb and ib are each independently an integer of 0–3 with the proviso that the sum of gb+hb+ib be at least 2; each $L^3$ and $L^4$ are independently a covalent bond, —CO—O—, —O—CO—, —CO—S—, —S—CO—, —CO—Se—, —Se—CO—, —CO—Te—, —Te—CO—, —$(CH_2CH_2)_{ka}$— (ka is 1–4), —CH=CH—, —C≡C—, —CH=N—, —N=CH—, —$CH_2$—O—, —O—$CH_2$—, —CO— or —O—;

$X^2$, $Y^2$ and $Z^2$ are each a substituent of $A^4$, $A^5$ and $A^6$, respectively, and each $X_2$, $Y_2$ and $Z^2$ are independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$— or —$C_{rc}H_{2rc}$—N($C_{pb}H_{2pb+1}$)—CO—; rc and rd are independently 1–20; sa is independently 1–10 for each ($C_{sa}H_{2sa}$—O), ta is 1–6; and pb is 0–4;

$R^4$ is —O—($C_{qc}H_{2qc}$—O$)_{wa}$—$C_{qd}H_{2qd+1}$, —($C_{qc}H_{2qc}$—O$)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$, —CO—O—$C_{qd}H_{2qd+1}$, —Cl, —F, —$CF_3$, —$NO_2$, —CN or —H; qc and qd are independently an integer of 1–20; wa is an integer of 1–10;

$R^5$ is ($C_{xb}F_{2xb}$—O$)_{za}$—$C_{ya}F_{2ya+1}$, wherein xb is independently 1–10 for each ($C_{xb}F_{2xb}$—O); ya is 1–10; and za is 1–10.

11. A liquid crystal device according to claim 6, wherein the pair of substrates are provided with first and second alignment control films, respectively, said first alignment control film provided to one substrate comprising a polyimide represented by the formula (I) and which has been subjected to a uniaxial aligning treatment, and said second alignment control film provided to the other substrate which has not been subjected to a uniaxial aligning treatment.

12. A liquid crystal device according to claim 1, wherein said chiral smectic liquid crystal composition shows no cholesteric phase and the pair of substrates are provided with first and second alignment control films, respectively, said first alignment control film provided to one substrate comprising a polyimide represented by the formula (I) and which has been subjected to a uniaxial aligning treatment, and said second alignment control film provided to the other substrate which has not been subjected to a uniaxial aligning treatment.

13. A liquid crystal device according to claim 1, wherein said chiral smectic liquid crystal composition shows cholesteric phase and the pair of substrates are provided with first and second alignment control films, respectively, each of said first and second alignment control film comprising a polyimide represented by the formula (I) and which has been subjected to a uniaxial aligning treatment.

14. A liquid crystal device according to claim 1 wherein said chiral smectic liquid crystal composition is an antiferroelectric liquid crystal composition disposed so as to provide a voltage-transmittance characteristic such that a transmittance curve includes two hysteresis loops.

15. A liquid crystal device according to claim 1, wherein said chiral smectic liquid crystal composition is an antiferroelectric liquid crystal composition and disposed in a state such that it shows only one stable state under no voltage application and provides a voltage-dependent apparent tilt angle changing characteristic wherein an apparent tilt angle is changed continuously depending on an applied voltage.

16. A liquid crystal device according to claim 1, wherein x and y are independently an integer of at least 1.

* * * * *

UNITED STATES PATENT AND TRADEMARK OFFICE
CERTIFICATE OF CORRECTION

PATENT NO. : 6,139,927
DATED : October 31, 2000
INVENTOR(S) : Hideaki Takao et al.

It is certified that error appears in the above-identified patent and that said Letters Patent is hereby corrected as shown below:

Title page,
Item [56] References Cited, under U.S. PATENT DOCUMENTS:
"5,326,600  7/1994  Asaska et al." should read
-- 5,326,600  7/1994  Asaoka et al. --; and
Under OTHER PUBLICATIONS:
In "Akihiro Mochizuki et al...." "its" should read -- Its --.

Column 2,
Line 30, "K.K.C.M.D.," should read -- K.K.C.M.C., --; and
Line 47, "etc." should read -- etc., --.

Column 3,
Line 47, "substrates." should read -- substrates, --.

Column 5,
Line 13, "treatment. Similarly" should read -- treatment, similarly --.

Column 8,
Line 8, "effection" should read -- effective --; and
Line 32,

" $-(CH_2)_{ra}-N(C_{pa}H_{2pa+1})-$ " should read

-- $-(CH_2)_{ra}-N(C_{pa}H_{2pa+1})-$ --.

Column 16,
II-52, "—$OCH_2CF_2$" should read -- —$OCH_2CF_3$ --.

Column 43,
Line 42, "tially" should read -- tial --; and
Line 62, "provide" should read -- provides --.

Column 48,
Line 32, "mentioned" should read -- measured --.

UNITED STATES PATENT AND TRADEMARK OFFICE
CERTIFICATE OF CORRECTION

PATENT NO.    : 6,139,927
DATED         : October 31, 2000
INVENTOR(S)   : Hideaki Takao et al.

It is certified that error appears in the above-identified patent and that said Letters Patent is hereby corrected as shown below:

Column 55,
Ex No. 16, " 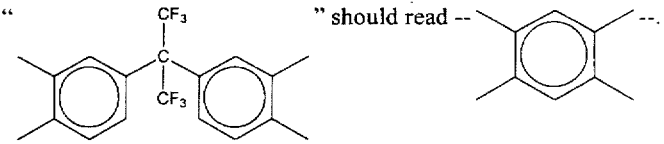 " should read -- 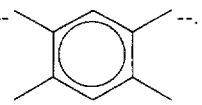 --.

Column 69,
Line 51, "characteristic (first occurrence) should be deleted; and
Line 62, "pair" should read -- pair of --.

Column 74,
Line 40, "claim 1" should read -- claim 1, --.

Signed and Sealed this

Twenty-sixth Day of February, 2002

*Attest:*

JAMES E. ROGAN
*Attesting Officer*     *Director of the United States Patent and Trademark Office*